(12) United States Patent
Pala

(10) Patent No.: US 11,177,967 B2
(45) Date of Patent: Nov. 16, 2021

(54) TEMPLATE BASED CREDENTIAL PROVISIONING

(71) Applicant: CABLE TELEVISION LABORATORIES, INC., Louisville, CO (US)

(72) Inventor: Massimiliano Pala, Longmont, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 359 days.

(21) Appl. No.: 16/271,659

(22) Filed: Feb. 8, 2019

(65) Prior Publication Data

US 2019/0245704 A1 Aug. 8, 2019

Related U.S. Application Data

(60) Provisional application No. 62/671,227, filed on May 14, 2018, provisional application No. 62/628,249, filed on Feb. 8, 2018.

(51) Int. Cl.
*H04L 9/32* (2006.01)
*H04L 12/24* (2006.01)
*H04L 29/06* (2006.01)

(52) U.S. Cl.
CPC .......... *H04L 9/3268* (2013.01); *H04L 9/3242* (2013.01); *H04L 9/3247* (2013.01); *H04L 9/3263* (2013.01); *H04L 41/0803* (2013.01); *H04L 67/42* (2013.01); *H04L 9/3265* (2013.01); *H04L 2209/38* (2013.01)

(58) Field of Classification Search
CPC ... H04L 9/3268; H04L 9/3242; H04L 9/3247; H04L 9/3263; H04L 41/0803; H04L 67/42; H04L 9/3265; H04L 2209/38
See application file for complete search history.

(56) References Cited

U.S. PATENT DOCUMENTS

| | | | | |
|---|---|---|---|---|
| 8,451,753 | B2* | 5/2013 | Vanga | H04L 41/0816 370/254 |
| 8,954,542 | B2* | 2/2015 | Parsons | H04L 41/0806 709/220 |
| 2005/0228874 | A1* | 10/2005 | Edgett | H04L 63/08 709/220 |
| 2012/0324061 | A1* | 12/2012 | Parsons | H04L 41/0806 709/220 |
| 2013/0205378 | A1* | 8/2013 | Oba | G06F 21/44 726/7 |
| 2017/0279614 | A1* | 9/2017 | Mercury | H04L 9/3247 |
| 2017/0286700 | A1* | 10/2017 | Sartor | G06F 21/45 |
| 2019/0372775 | A1* | 12/2019 | Camenisch | H04L 63/12 |

* cited by examiner

*Primary Examiner* — Arvin Eskandarnia
(74) *Attorney, Agent, or Firm* — Lathrop GPM, LLP

(57) ABSTRACT

A certificate re-provisioning (CREP) protocol allows a client device to communicate with a provisioning server and be automatically provisioned, or re-provisioned, with needed credentials without the client device being aware of which credentials it needs. The CREP protocol uses a slot configuration template that defines which credentials are installed on the client device and the provisioning server responds with actions to provision the client device according to a client target configuration stored at the server.

33 Claims, 11 Drawing Sheets

TEMPLATE BASED CREDENTIAL PROVISIONING

RELATED APPLICATIONS

This application claims priority to U.S. Patent Application Ser. No. 62/628,249, titled "Template Based Certificates (Re) Provisioning Protocol (TecPRO)", filed Feb. 8, 2018, and claims priority to U.S. Patent Application Ser. No. 62/671,227, titled "Template Based Certificates (Re) Provisioning Protocol (TecPRO)", filed May 14, 2018, each of which is incorporated herein by reference in its entirety.

BACKGROUND

Configuring client devices with the appropriate and needed credentials to allow operation in one or more secure ecosystems requires knowledge of which ecosystems are to be accessed, which credentials are needed for these ecosystems, and from where to obtain these credentials.

SUMMARY

It would be convenient if a client device could be automatically provisioned without a priori knowledge of which credentials are needed by the client device. An automatic provisioning protocol may be used by any communicable device such that it may be provisioned from a server without a user needing to know which credentials are needed.

In one embodiment, a certificate provisioning method includes: receiving, within a provisioning server and from a client device, a request message including a client identifier and a slot configuration template defining a current configuration of credentials on the client device; retrieving a client target configuration from a configuration database based upon the client device identifier; determining differences between the current configuration and the client target configuration; generating, based upon the differences, an action item set to include at least one action item for provisioning the client device; generating a response message including a first action item of the action item set; and sending the response message to the client device.

In another embodiment, a certificate provisioning method includes: generating, within a client device, a request message including a client identifier and a slot configuration template defining a current configuration of credentials on the client device; sending the request message to a provisioning server; receiving, from the provisioning server, a response message including an action; performing the action on the client device; updating the request message to include a result of the action on the client device; and sending the updated request message to the provisioning server.

DETAILED DESCRIPTION OF THE EMBODIMENTS

Figure 1:
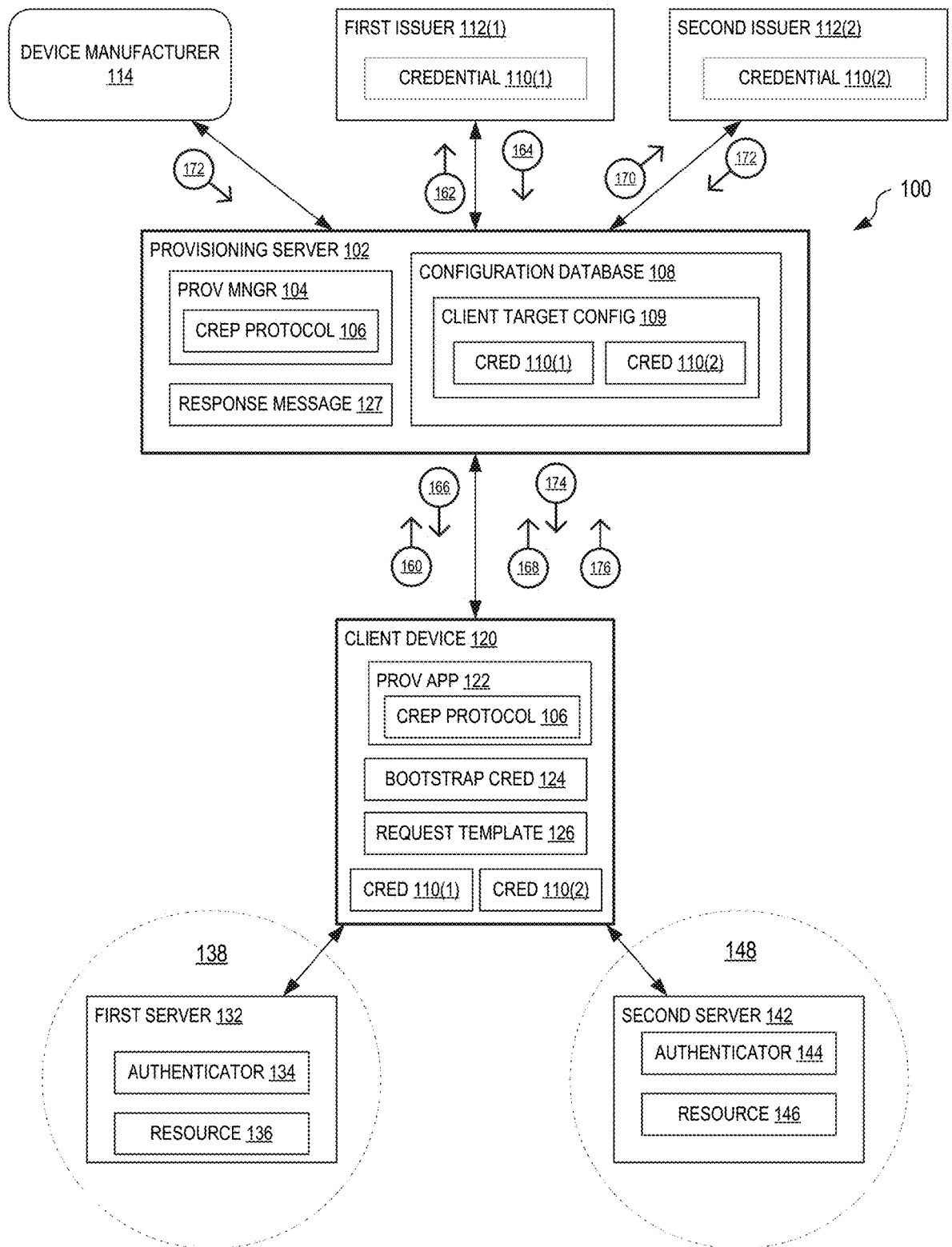
FIG. 1 is a block diagram illustrating one example system for template based credential provisioning, in an embodiment.

For a client device (e.g., an Internet-of-things (IoT) device, a laptop computer, a smartphone, a smart lightbulb, a smart thermostat, and so on) to communicate with a secure device, a level of trust must be established between the client device and the secure device. The secure server and associated networks may be referred to as an ecosystem, where trusted devices may operate. To provide evidence of trustworthiness of the client device to the secure server, the client device must send a credential (e.g., a certificate, certificate chain, and so on) that may be recognized and verified by the secure server. Accordingly, it is desirable to provision the client device with credentials needed to allow the client device to operate in the secure ecosystem. Conventionally, the client device must be aware that it needs a certain credential operate in a certain ecosystem, and must specifically request that credential from a certain certification authority (CA). Protocols exist for such provisioning (and de-provisioning), such as CMP, CMC, SCEP, and ACME. Some ecosystems may require multiple credentials, and each credential may require communication with a different CAs. Thus, the client device must know which CA to use when requesting the credential. The CAs may be hierarchical, where one CA is the root, and other CAs may be intermediate. The credential may be a digital certificate that includes information about a public key contained within the certificate, information about the identity of the client device, and a digital signature of an issuer (e.g., a CA) that has verified the certificate's contents. Thus, when the digital signature is valid, and the authenticator examining the certificate trusts the issuer, then the authenticator may use that public key to communicate securely with the client device. Thus, to provision the client device with the appropriate credential(s) from the appropriate issuer(s), the client device must contact the appropriate issuer of the credential, provide a level of trust (e.g., a bootstrap credential), and provide a public key (generating the public and private key pair as needed).

Preferably, the client device (e.g., secure element within the client device) is configured a priori with information defining which credentials are needed on the client device and correspondingly which issuer(s) must be contacted to obtain these credentials. Further, the user of the client device, or a manufacturer of the client device, must manage (install, update, revoke, etc.) the required credentials on the client device to ensure correct operation of the client device. For example, a manufacturer may produce a large numbers of client devices that are purchased by consumers and then configured to operate within the manufacturer's ecosystem, the consumers ecosystem, and possibly others. Accordingly, credential management of each of these client devices is a complex task. To solve these problems, the embodiments described herein disclose a provisioning server that uses a template-based provisioning protocol to automatically provision a client device with the appropriate credentials. Advantageously, the provisioning server, through use of the template-based provisioning protocol, provides a mechanism for provisioning the client device without requiring the client device (or the user of the client device) to know which credentials are needed, or which issuers provide the credentials (e.g., certificates). The initial requirement of the client device is that it includes a bootstrap credential (see for example U.S. patent application Ser. No. 15/909,589 filed Mar. 1, 2018 and Issued U.S. Pat. No. 9,774,709) to provide basic trust of the device, an identifier defining the device (e.g., a Unique Device ID (UDID) utilized in Apple® products, device IDs utilized by Android™ products, a digital certificate issued by a certificate authority (CA), any identity credentials, a more generic device type ID for identifying a device type, etc.), and ability to connect to the provisioning server. These initial requirements are easily met by the manufacturer of the client device and provisioning of the client device, once deployed for example, is facilitated through communication with the provisioning server. With the proliferation of IoT devices, each requiring a trust to operate in one or more ecosystems, simplification of credential provisioning of the client device once deployed greatly eases the burden of the manufacturer without making the provisioning more difficult for the consumer. Further, the client device may periodically communicate with the provisioning server and re-provision itself if needed, all without user intervention.

FIG. 1 is a block diagram illustrating one example system 100 for template based credential provisioning. System 100 includes a provisioning server 102 that may use a certificate re-provisioning (CREP) protocol 106 to communicate with a client device 120. CREP protocol 106 is shown implemented within both provisioning server 102 and client device 120 and represents the corresponding portion of the CREP protocol as implemented in that device. Client device 120 may represent one of an Internet-of-things (IoT) device, a laptop computer, a smartphone, a smart lightbulb, a smart thermostat, and other similar devices. Provisioning server 102 may also communicate with one or more credential issuers 112 (e.g., certificate authorities (CAs)) and one or more device manufacturers 114. In the example of FIG. 1, client device 120 is provisioned to operate within a first ecosystem 138 where client device 120 communicates with a first server 132, and to operate within a second ecosystem 148 where client device 120 communicates with a second server 142. For example, first server 132 may include a resource 136 protected by an authenticator 134 that requires the client device 120 to provide a credential 110(1) for authentication before allowing the client device 120 to access to the resource 136. Second server 142 includes a second resource 146 protected by a second authenticator 144 that requires the client device 120 to provide a credential 110(2) for authentication before allowing access to the second resource 146. The first credential 110(1) is issued by the first issuer 112(1) and the second credential 110(2) is issued by the second issuer 112(2). Accordingly, before successful operation, client device 120 is provisioned with the first credential 110(1) and the second credential 110(2).

To facilitate automatic provisioning of client device 120, provisioning server 102 includes a provisioning manager 104 and a configuration database 108 storing a client target configuration 109 that defines the requirements for client device 120 to operate in first ecosystem 138 and second ecosystem 148. In the example of FIG. 1, client target configuration 109 defines that client device 120 needs to authenticate itself using the first issuer 112(1) to obtain the first credential 110(1), and needs to authenticate itself using the second issuer 112(2) to obtain the second credential 110(2). For example, device manufacturer 114 may interact with provisioning server 102 to generate client target configuration 109. In certain embodiments, as client target configuration 109 is generated, provisioning manager 104 may interact with first issuer 112(1) to receive credential 110(1) and/or interact with second issues 112(2) to receive credential 110(2). For example, provisioning manager 104 may store credentials 110 in configuration database 108 in association with client target configuration 109. Accordingly, provisioning server 102 may be fully prepared to provision client device 120 prior to being contacted by client device 120. Alternatively, provisioning manager 104 may interact with issuers 112 as part of CREP protocol 106 during provisioning of client device 120.

Client device 120 includes a provisioning application 122 that implements CREP protocol 106 to communicate with provisioning server 102. Within the provisioning server 102, provisioning manager 104 may authenticate client device 120 using a bootstrap credential 124, included with the client device 120 by the manufacturer 114 for example, and then provision client device 120 with credentials 110(1) and 110(2), based upon client target configuration 109.

Advantageously, for initial provisioning, or re-provisioning, client device 120 only needs to communicate with provisioning server 102 using CREP protocol 106. In certain embodiments, bootstrap credentials 124 and provisioning application 122 including CREP protocol 106 and a communication address (e.g., URL) of provisioning server 102, are preconfigured within client device 120, for example, as a preloaded software module, and/or as a preconfigured processing circuit. In other embodiments, provisioning application 122 may be downloaded from a server and installed onto client device 120.

In another example, manufacturer 114 may update client target configuration 109 such that client device 120 is updated when next connecting to provisioning server 102. For example, to automatically install a new credential onto each of a plurality of client devices 120, manufacturer 114 may send a command to provisioning server 102 to update client target configuration 109 of each of the plurality of client devices such that each client device 120 is automatically updated when next connecting to provisioning server 102.

Figure 2:
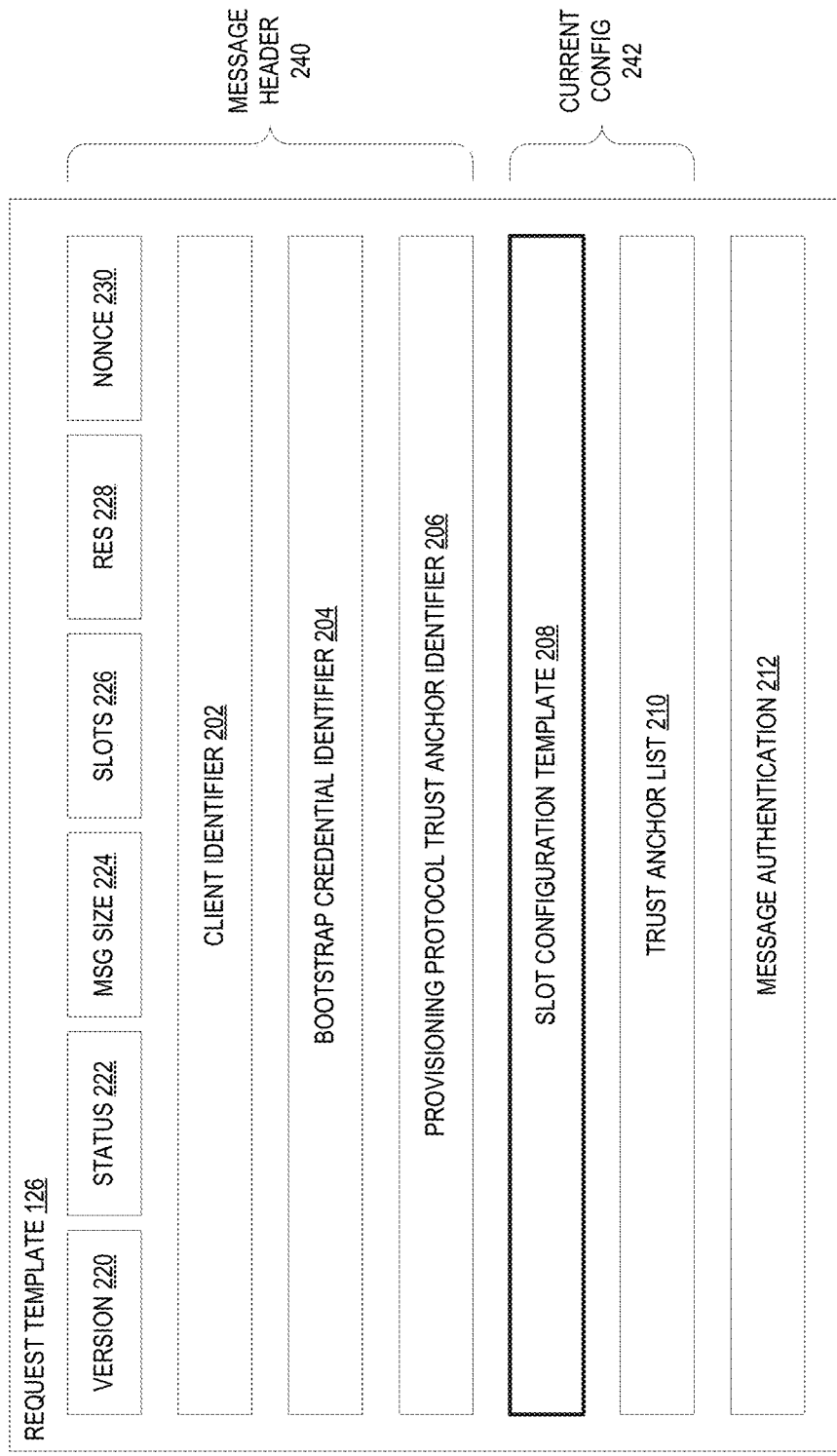
FIG. 2 a block diagram illustrating the request template of FIG. 1 in further example detail, in an embodiment.
Figure 3:
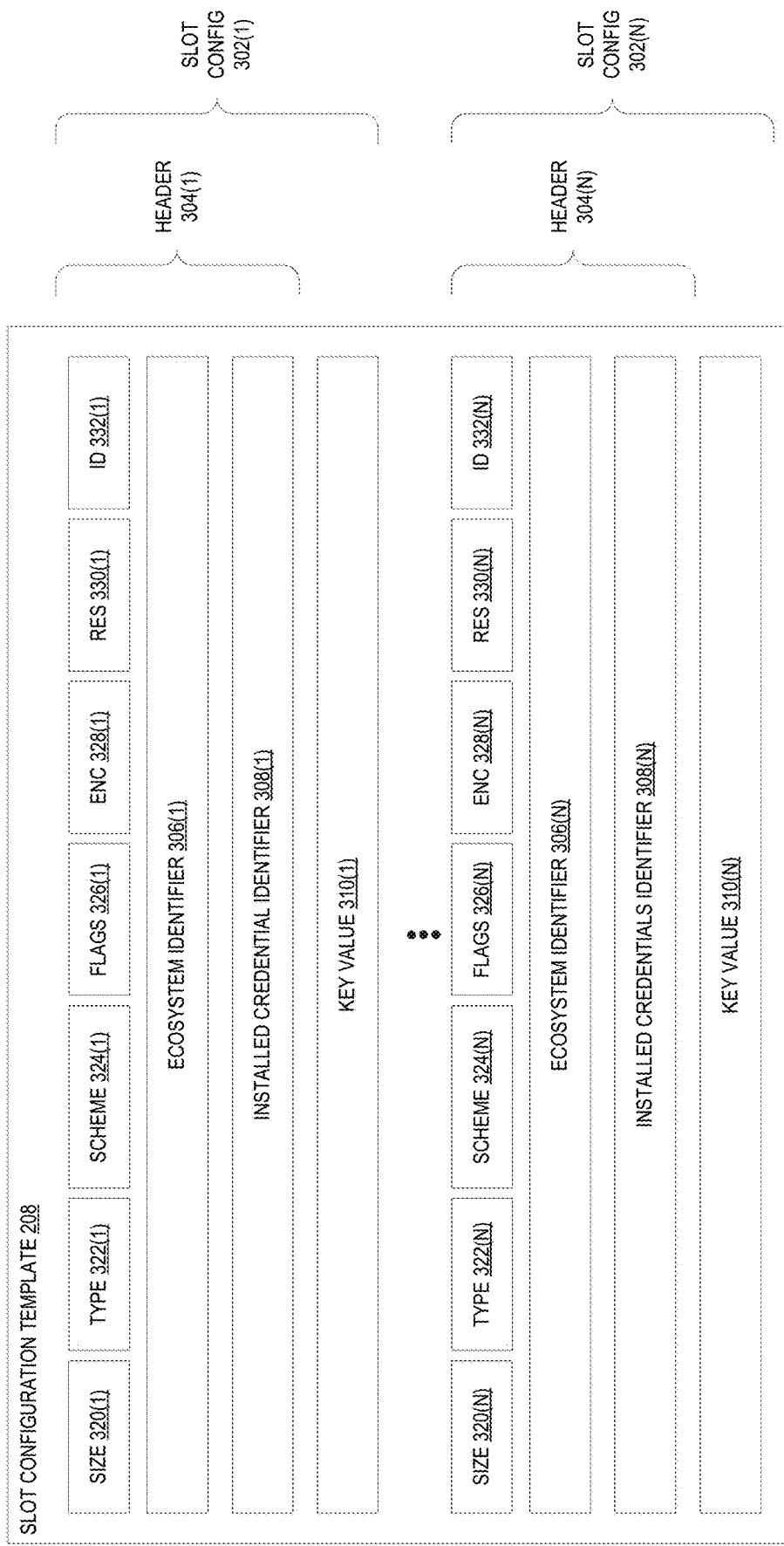
FIG. 3 is a block diagram illustrating the slot configuration template of FIG. 2 in further example detail, in an embodiment.

FIG. 2 is a block diagram illustrating the request template 126 of FIG. 1 in further example detail. FIG. 3 is a block diagram illustrating the slot configuration template of FIG. 2 in further example detail. FIGS. 2 and 3 are best viewed together with the following description.

In an embodiment, the client device 120 sends request template 126 to provisioning server 102 in a first message 160 for example. Thus, the format of first message 160 sent from the client device 120 to provisioning server 102 does not change. This makes communication for the client device 120 much simpler, allowing CREP protocol 106 to be implemented on less capable devices, such as battery powered IoT devices. Provisioning server 102 processes the request template 126, received in first message 160, and generates a response message 127 that is sent back to the client device 120 as subsequent (second) message 166. The response message 127 may include a credentials and/or indicate an action for the client device 120. The client device 120 may update request template 126 to reflect a current status of the client device 120 and send the request template 126 to the provisioning server 102 in third message 168.

The request template 126 includes a message header 240, a current configuration 242, and a message authentication 212. The message header 240 has a fixed size of 128 bytes, for example, and it is followed by the current configuration 242 that includes a slot configuration template 208 and a trust anchor list 210 that collectively defines a list of credentials 110 already provisioned in the client device 120. The message authentication 212 is a signature of a hash-based message authentication code (HMAC) and may depend upon a type of bootstrap credential 124 that is pre-registered with provisioning server 102.

Request Template Header

Message header 240 may include: a protocol version number 220 (e.g., 1 byte in length), a device status code 222 (e.g., 1 byte in length), a message size 224 (e.g., 2 bytes in length), a number of slots in template message 226 (e.g., 1 byte in length), a reserved location 228 (e.g., 1 byte in length), a nonce 230 (e.g., 26 bytes in length), a client identifier 202 (e.g., 32 bytes in length), a bootstrap credentials identifier 204 (e.g., 32 bytes in length), and a provisioning protocol trust anchor identifier 206 (e.g., 32 bytes in length).

Protocol version number 220 identifies a version of CREP protocol 106 being used by the client device 120. This allows the provisioning server 102 to cater for older client devices after the CREP protocol 106 has been changes to a newer version.

Device status code 222 is a bitmask where the higher 4 bits carry information about the internal status of client device 120 (Device Status Bitmask or DSB) while the lower 4 bits carry the return code of the previous operation requested by the server (Operation Return Code or ORC). The first template message sent to the server will always have the lower 4 bits set to "0" (i.e., xxxx-0000, where xxxx indicates the internal status of client device 120) since there has not been any previous action that was requested by the server for which the server is expecting the result code. The Device Status Bitmask (DSB) may have the following values:

| Value | Name | Description |
|---|---|---|
| 0001 | DEVICE_READY | This flag indicates that the device is ready for further processing. If this flag is not set, the device is not ready to perform actions sent by the server. In this case, the server will reply with the appropriate response message and close the connection. |
| 0010 | DEVICE_KEY_SLOT_AVAILABLE | This flag is used to indicate that the device has at least one key slot available that can be used to install new credentials. If not set, the device has no available slots where to install new credentials (all slots have already been assigned a credential) |
| 0100 | DEVICE_KEY_GEN_CAPABLE | This flag indicates that the device is capable to generate at least another keypair. If not set, the device can not generate new keypairs, therefore it cannot accept or install credentials that require new key generation. |
| 1000 | DEVICE_NEVER_PROVISIONED | This flag indicates that the device was never provisioned i.e., there are no installed credentials or Trust Anchors on the device. This flag is usually set when the device first connects to the provisioning server or it was reset. When set, the special message authentication is used for the server's Response message. |

The lower 4 bits (ORC) represent the return code of the requested operation and its value is one of:

| Value | Name | Description |
|---|---|---|
| 0x00 | RC_NONE | This code is used when there is No Return Code to be sent back to the server. This is the case, for example, for every first request messages sent at the beginning of the protocol. |
| 0x01 | RC_SUCCESS | This code is used to indicate that the operation that was requested by the server has completed successfully. |
| 0x02 | RC_GEN_ERROR | This code is used when the device encountered a generic error when performing the last operation. |
| 0x03 | RC_OP_NOT_SUPPORTED | This code is used when the device does not support the operation that the server requested in the previous message. |
| 0x04 | RC_ALGOR_NOT_SUPPORTED | This code is used when an operation (such as the installation of Trust Anchors or Credentials) involves the use of a cryptographic algorithm that is not supported by the device. |

| Value | Name | Description |
|---|---|---|
| 0x05 | RC_MSG_AUTH_FAILED | This code is used when the device cannot authenticate the message from the server (e.g., the message was corrupted). |
| 0x06 | RC_MSG_MALFORMED | This code is used when the device cannot properly parse the response from the server (e.g., the message structure does not conform to the specification, the size of the message is not the one that is expected, etc.) |

Message size 224 defines the total size (e.g., in bytes) of request template 126.

Number of slots in template message 226 defines the number of slots that are exposed within slot configuration template 208 of the request template 126.

Reserved location 228 is reserved for future use and helps keep the message a fixed length while allowing change.

Nonce 230 is a random value assigned by client device 120 for each request message sent to provisioning server 102, and is returned in messages from the provisioning server 102. This provides protection against reply attacks.

Client identifier 202 is a hash (e.g., SHA-256) calculated over a unique identifier assigned to client device 120 (or secure element therein) at manufacture time, and may be used to identify the device to provisioning server 102.

Bootstrap credentials identifier 204 is a hash (e.g., SHA-256) calculated over the bootstrap credentials value (e.g., the raw public key) already installed on client device 120.

Provisioning protocol trust anchor identifier 206 is a hash (e.g., SHA-256) calculated over the trust anchor (if present) installed on the device. This Trust Anchor is usually in the form of a Public Key and it is used as the Key-Signing-Key (KSK) for the public key of provisioning server 102. Client device 120 uses the bootstrap trust anchor to verify the signature over the public key (that will be used to verify the response message's signature) of the provisioning server 102 in the signature field of response messages.

Message Body

Current configuration 242 forms the body of request template 126 and includes a slot configuration template 208 (variable in length) and a trust anchor list 210 (variable in length). Slot configuration template 208 includes a list a list credentials that are available on the device. For reasons of security, slot configuration template 208 should not include credentials (e.g., bootstrap credential 124) used to sign the request messages from client device 120, and should not include the key-signing-key (e.g., the Trust Anchor for the server message authentication) that is used to verify the authenticity of the public key of provisioning server 102.

In certain embodiments, client device 120 may provide only the list of actually generated/installed keys (i.e., where a key value is not empty), whereas in other embodiments, client device 120 may include the list of actually generated/installed keys and key slots that have no key values yet. Where the client device has a fixed number of key slots, this approach allows the client device 120 to re-use the same request template 126 when new keys are generated, when the only change to the request template 126 is in the key value and associated meta-data; there is no change in the size of request template 126.

Each slot configuration 302 of the slot configuration template 208 includes a set of meta-information that may be evaluated, by the provisioning server 102, against information stored within configuration database 108 to identify inconsistencies. Each slot configuration 302 includes a header 304 (e.g., 96 bytes in length) and a variable size body that contains a key value 310 (e.g., a value of the public key stored in that configuration slot).

Each header 304 includes the following information: a key size 320 (e.g., 2 bytes in length) defining the size in bytes of the key value 310, a key type 322 (e.g., 1 byte in length), a key scheme 324 (e.g., 1 byte in length), key flags 326 (e.g., 2 bytes in length), key encoding 328 (e.g., 1 byte in length), reserved 330 (e.g., 1 byte in length), a slot identifier (ID) 332 (e.g., 24 bytes in length), an ecosystem identifier 306 (e.g., 32 bytes in length), an installed credential identifier 308 (e.g., 32 bytes in length), and key value 310 (e.g., variable in length).

For example, for an EC key (P256), the key record is 128 Bytes (96 bytes header plus 32 bytes key value). For an RSA key (2048 bits), the overall size of the key record is 352 Bytes (96 bytes header plus 256 bytes key value).

Key size 320 defines the size (in bytes) of key value 310. For example, key size 320 may be interpreted as a 16 bits integer (network byte order). When the slot has no key installed, key size 320 may be set to zero (e.g., 0x00 0x00) to indicate that key value 310 is empty, for example. Alternatively, key size 320 may define a number of bytes supported by the client device 120 for key value 310. For example, even though not yet defined, key value 310 may be included and have a length defined by key size 320 and each by of key value 310 is set to zeros (e.g., 0x00). Key type 322 is used to specify the type of the key corresponding to that slot configuration 302. Example values of key type 322 are:

| Value | Name | Description |
|---|---|---|
| 0x00 | KEY_TYPE_NONE | This value is used when key value 310 is empty. |
| 0x01 | KEY_TYPE_PUBLIC | This value is used when the key value 310 contains a "Public" Key and the corresponding private key is also installed. |
| 0x02 | KEY_TYPE_ROOT | This value is to be used when key value 310 contains a "Public" Key and the corresponding private key is unknown to the client device 120. |

Key scheme 324 indicates a type of algorithm used for the key in key value 310. Example values of key scheme 324 are:

| Value | Name | Description |
|---|---|---|
| 0x01 | KEY_SCHEME_RSA | This value is used when key value 310 contains an RSA key. |
| 0x02 | KEY_SCHEME_EC | This value is used when key value 310 contains an ECC key. |

Key Flags 326 defines additional information about the key contained in key value 310. In particular, for RSA keys, key flags 326 is set to zero (e.g., 0x00); for ECC keys, key flags 326 indicates the curve used by the ECC algorithm. Examples values of key flags 326, when key scheme 324 is set to KEY_SCHEME_EC are:

| Value | Name | Description |
|---|---|---|
| 0x00 | EC_CURVE_P256 | OID 1.2840.10045.3.1.1.7 |
| 0x01 | EC_CURVE_P384 | OID 1.3.142.0.34 |
| 0x02 | EC_CURVE_P521 | OID 1.3.142.0.35 |

Key Encoding 328 indicates the encoding of the Public Key. Example values of key encoding 328 are: 0x00—KEY_ENCODING_RAW, and 0x01—KEY_ENCODING_X509.

Reserved 330 may be set to zero (e.g., 0x00) and is reserved for future use and helps keep the message a fixed length while allowing change.

Slot ID 332 includes an identifier of slot configuration 302 and may be similar to (or identical to) an identifier used in the Credentials Registration Message to pre-register initial credentials and key pairs. In an embodiment, credentials together with a public key, are placed in a credentials registration message. The credentials registration message may be timestamped and signed with the corresponding private key. Alternatively, a credentials registration message includes a selected visual credential, a passcode, and/or a secure element identifier.

Ecosystem identifier 306 is an identifier (e.g., UTF-8 encoded and Zero ("0") padded) of an ecosystem where the credential may be used (if a credential has been issued for an identified ecosystem). For example, ecosystem identifier 306 may include "OCF" or "OpenADR". Ecosystem identifier 306 may remain empty (e.g., 0x00 filled) until an ecosystem-specific credential is issued for the key contained within key value 310. The value of ecosystem identifier 306 may be copied from response message 127 during credential installation.

Installed credential identifier 308 may define a hash (e.g., SHA-256) of the credential installed in the slot configuration 302. In particular, when the credential included in key value 310 is an X.509 certificate, the hash is calculated over the DER representation of the certificate. When no credential is installed in the slot configuration 302, this value may be empty (e.g., 0x00 filled). Installed credential identifier 308 may be used by provisioning server 102 to verify that the correct credential for the slot's public key is installed in client device 120 (e.g., an updated certificate for the same public key is correctly stored in the slot).

Key value 310 may include a value of the Key for the slot configuration 302.

Trust Anchor List

Trust anchors list 210 indicates trusted keys known to the client device 120. When client device 120 has not yet been provisioned (e.g., DEVICE_NEVER_PROVISIONED is indicated by the device status bitmask (DSB) of device status code 222), trust anchors list 210 may be empty. When client device 120 has successfully used CREP protocol 106, trust anchors list 210 includes at least an authentication key of provisioning server 102. Trust anchors list 210 includes a trust anchor header and trust anchor records. The header includes a status flag (e.g., 1 byte in length) and a count of installed trust anchors (e.g., 1 byte in length). Each trust anchor record includes: a type of the trust anchor (e.g., 1 byte in length), a reserved field (e.g., 1 byte in length), an ecosystem identifier (e.g., 30 bytes in length), and a hash of the trust anchor (e.g., 32 bytes in length).

Trust anchor list 210 does not include the trust anchor used to validate messages from provisioning server 102. The trust anchor header is small and provides the status and the number of trust anchors (other than the trust anchor used to validate messages from provisioning server 102) installed on client device 120. The status flag is a bitmask defining a status of the trust anchors' store, and the bitmask may include: TA_STATUS_IMMUTABLE (e.g., 0x01) that when set indicates that the trust store cannot be updated, and when not set indicates that the Trust Store may be updated; and TA_STATUS_FULL (e.g., 0x02) that, when set, indicates that the trust store has is full and cannot accept new trust anchors (although existing trust anchors may be replaced), and when not set indicates that the trust store on the device has room for at least one new trust anchor. The count of installed trust anchors indicates the number of installed trust anchors.

The trust anchor record includes a trust anchor type (e.g., 1 byte in length), a reserved field (e.g., 1 bytes in length), an ecosystem identifier (e.g., 32 bytes in length), and a trust anchor identifier (e.g., 32 bytes in length). The trust anchor type may indicate one of a certificate, a Public key, a symmetric, or other. The reserved field is reserved for future use. The ecosystem identifier may identify an ecosystem to which the trust Anchor is related. Where the ecosystem identifier is longer than 32 bytes, the ecosystem identifier may be truncated to be 32 bytes in length. Ecosystem identifiers that are shorter than 32 bytes are zero-padded (e.g., 0x00). The trust anchor identifier is a hash (e.g., SHA-256) calculated over the value of the trust anchor. For trust anchors that are X.509 certificates, the hash is calculated over the DER representation of the trust anchor. For trust anchors that are provided in the form of Public keys, the hash is calculated over the raw value of the key (e.g., for key-signing-key trust anchors). The key-signing-key and the trust anchor associated with the provisioning server 102 should not be exposed in the trust anchor list 210. In certain embodiments, the reserved field may be used to indicate a size of free space in the trust anchor list 210.

Response Message

Figure 4:
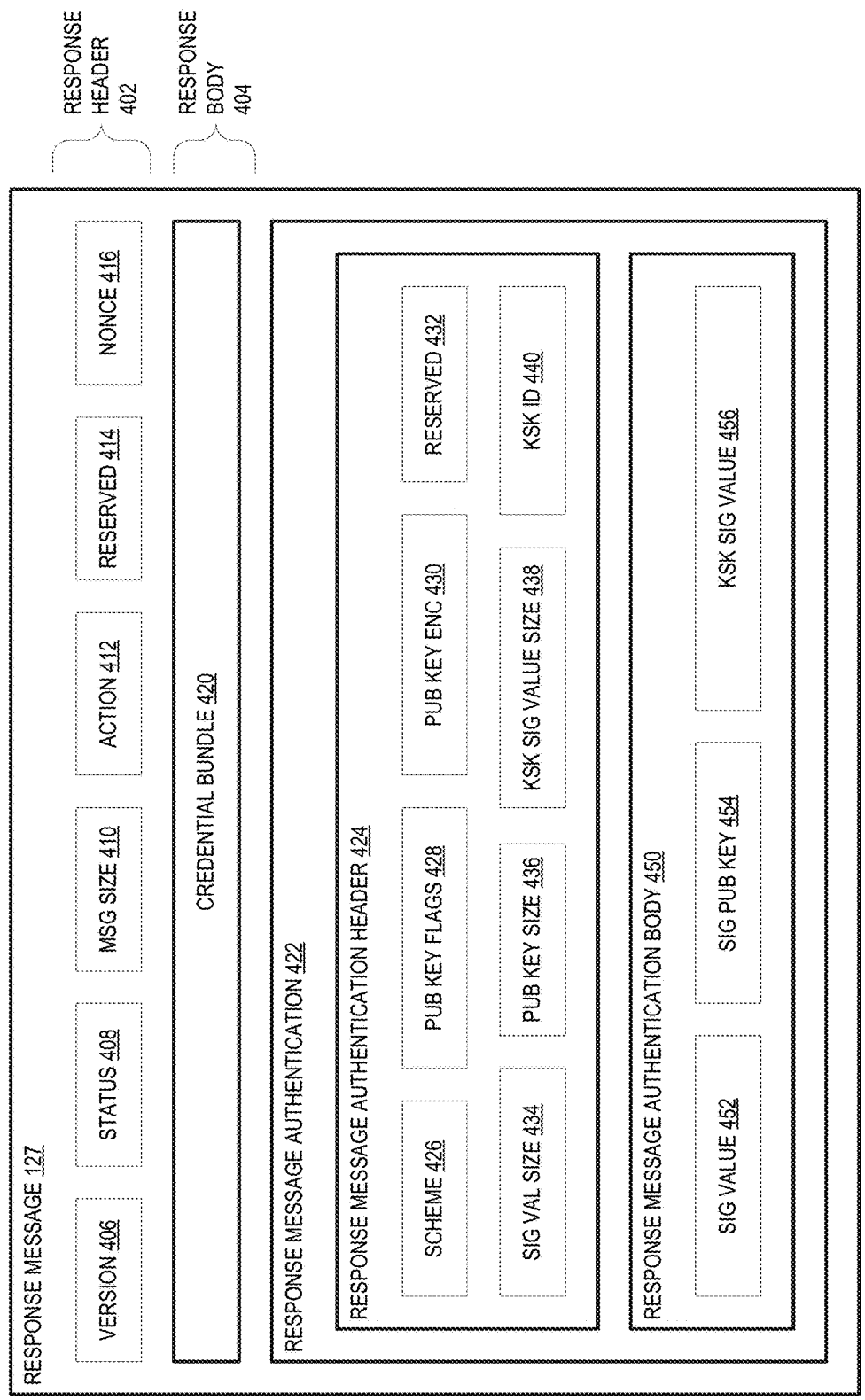
FIG. 4 shows the response message of FIG. 1 in further example detail, in an embodiment.

FIG. 4 shows response message 127 of FIG. 1 in further example detail. Response message 127 is generated by provisioning server 102 and follows a similar approach to the request template 126 in that response message 127 has a response header 402 of a fixed size (e.g., 32 bytes in length), and a response body 404 and a response message authentication 422 that may be variable in length.

Response message authentication 422 may be generated in one of several different ways depending upon whether client device 120 has already been provisioned (as indicated in device status code 222 received from client device 120) and a type of the bootstrap credential (as indicated by bootstrap credential identifier 204 received from client device 120). To avoid the burden of certificate parsing and validation within CREP protocol 106, authentication makes direct use of keys (public or secret).

Where bootstrap credential identifier 204 indicates that bootstrap credential 124 of client device 120 is based upon public key cryptography, provisioning manager 104 authenticates response message 127 by generating response message authentication 422 as a signature of response header 402 and response body 404 using a private key of a Key Pair of provisioning server 102. Response message authentication 422 may also include a public key of the key pair in the response message authentication 422. Response message authentication 422 may also include a signature of the public key generated by the trusted key-signing-key installed on client device 120. The trusted key-signing-key may be pre-installed on client device 120 or may be installed during an initial round of messages of CREP protocol 106.

When Public keys are used to authenticate responses from provisioning server 102, the following key hierarchy should be implemented: a trusted key-signing-key (KSK) used to generate signatures for all public key values included in the response messages; and a server key used by client device 120 to authenticate responses from provisioning server 102. Where many instances of provisioning server 102 operate, it is preferred that each instance use different keys. The Public Key of provisioning server 102, together with the associated signatures generated using the KSK, are sent in response message authentication 422 and may be used to validate response message 127. The KSK may be installed on client device 120 using out-of-band mechanisms (e.g., by pre-configuring client device 120 or a secure element thereof) or by providing the KSK during the first round of messages when provisioning client device 120.

First Message Authentication without Pre-Installed KSK

To authenticate response message 127 from provisioning server 102 when client device 120 is not provisioned (e.g., is in its initial state) with a KSK used by provisioning server 102, provisioning manager 104 may use a salted hash to generate response message authentication 422 as a MAC that client device 120 may use to authenticate response message 127 from provisioning server 102. Security may rely upon bootstrap credentials 124 never having been disclosed.

Where bootstrap credential 124 is a symmetric key or passphrase, the MAC is generated as follows:

MAC=Hash$_{SHA\text{-}256}$[MESSAGE∥SECRET∥NONCE]

Similarly, when bootstrap credential 124 is a keypair, the value of the public key is used in place of the secret:

MAC=Hash$_{SHA\text{-}256}$[MESSAGE∥PUBKEY∥NONCE]

This authentication is used when client device 120 indicates, in request template 126, that it has not yet been provisioned or when client device 120 has gone through a hard reset and the installed credentials and/or trust anchors are not available anymore.

Response Message Header

Response header 402 includes a protocol version number 406 (e.g., 1-3 bytes in length, but preferably 1 byte in length), a server status code 408 (e.g., 1-3 bytes in length, but preferably 1 byte in length), optional a message size 410 (e.g., 2-4 bytes in length, but preferably 2 bytes in length), an action code 412 (e.g., 1-3 bytes in length, but preferably 1 byte in length), a reserved field 414 (e.g., 1-3 bytes in length, but preferably 1 byte in length), and a nonce 416 that is copied from nonce 230 of request template 126 when received in first message 160 for example. Response body 404 may include a credential bundle 420 that is variable in length, or that may be omitted (e.g., zero in length).

Protocol version number 406 defines a version of CREP protocol 106 and should match protocol version number 220 of the request template 126 to indicate that response message 127 follows the syntax of the protocol version supported by client device 120. When provisioning manager 104 does not support the version of CREP protocol 106 indicates by protocol version number 220, provisioning manager 104 may send an empty response message 127 with the appropriate error code.

Server status code 408 indicates a status of provisioning server 102 and a validity of the received request template 126. The following values (together with the intended server's behavior) are defined:

| Value | Name | Description |
| --- | --- | --- |
| 0x00 | valid | The request received from the client was properly parsed, authenticated, and processed. This indicates the client that its request was accepted and the response contains a valid action request. |
| 0x01 | malformedReq | The request's structure did not conform to the specification and the server did not manage to parse it. When using this code, the server shall send an empty response that carries only the header (i.e., the body is empty and no authentication is added to the response message) and close the connection. |
| 0x02 | unauthorized | The server parsed the request properly, however the server did not manage to validate the authentication in the request (i.e., no valid signature or unknown client identifier was detected). When using this code, the server shall send an empty response that carries only the header (i.e., the body is empty and no authentication is added to the response message) and close the connection. |
| 0x03 | internalError | The server currently cannot process the request (however the request shall be correctly formatted and authenticated) because of an internal error. When using this code, the server shall send a response with an empty body (but valid signature) to the client and close the connection. |

Message size 410 indicates a size, in bytes, of the response message 127.

Action code 412 defines the action provisioning manager 104 requires of client device 120. The following values are defined:

| Value | Name | Description |
| --- | --- | --- |
| 0x01 | installTrustAnchor | Response message 127 includes a new trust anchor for client device 120 to securely store. The trust anchor is sent within credential bundle 420. This action code is used when the trust anchor is not related to any other credential of the client device 120. For example, this action code may be used to install a trust anchor that validates the connection of client device 120 to a cloud provider or to validate credentials from a different ecosystem for which the device does not have its own credential. |

-continued

| Value | Name | Description |
| --- | --- | --- |
| 0x02 | removeTrustAnchor | Client device 120 should remove a trust anchor not associated with any installed credentials. E.g., may be used to remove trust anchors installed using the "installTrustAnchor" action and should not be used to remove a trust anchor that is associated with installed credentials. For the latter use case, the server shall use the "removeCredentials" (0x11) code to completely remove the chain of credentials related to an ecosystem. |
| 0x10 | installCredential | Client device 120 should store a new credential, related to a public key installed in one of the target slot inside the client's trust store. All the header parameters shall be set accordingly (e.g., ecosystem identifier 520 identifies the ecosystem corresponding to the new credential, number of entries 506 shall be set to the number of credentials records included in credentials bundle 420, etc.) |
| 0x11 | updateCredential | Client device 120 is to update credentials in the indicates slot with the included credentials. Credential bundle 420 includes the chain of credentials (similar to the "installCredential" action and ecosystem identifier 520 should match the one already present in the identified slot. Client device 120 should not accept updated credentials when the ecosystem identifiers do not match. Client device 120 should replace the chain of credentials for the identified slot with the new set included in the credentials bundle 420 (since intermediate CAs may change, such as when credentials from the same ecosystem are issued by a different SubCA). |
| 0x12 | removeCredential | Client device 120 should remove an installed credential (and associated intermediate CAs and trust anchor) from the slot identified by slot identifier 518. Credential bundle record 522 is empty and number of entries 506 is zero. Client device 120 does not delete or remove any corresponding installed keypairs (see "removeKeyPair" code). Where multiple installed credentials exist for the same ecosystem, client device 120 should ensure that the chain of credentials is still available for credentials installed in other slots. |
| 0xF0 | generateKeyPair | The client device 120 should generate a new keypair for an empty slot identified by slot identifier 518 of credentials bundle header 502, but ecosystem identifier 520 is empty (e.g., 0x00 filled), number of entries 506 is zero, and credentials bundle record 522 is empty. This code cannot be used to overwrite an existing keypair - to replace a keypair, the "removeKeyPair" command should first be used. |
| 0xF1 | removeKeyPair | Client device 120 should remove (or zero fill) the key stored in the slot indicated by slot identifier 518 of credential bundle header 502. Credentials bundle record 522 is empty, number of entries 506 is zero, and ecosystem identifier 520 is zero. removeKeyPair cannot be used when the identified slot is provisioned with ecosystem credentials; in that case, "removeCredential" should be used. |
| 0xFE | installProvisioningTA | Client device 120 should install a new trust anchor for use in validating messages during the provisioning protocol. The trust anchor is sent within the Credential Bundle and the ecosystem identifier value shall be filled with 0xFF. Credentials bundle 420 include one credential bundle record 522. Client device 120 should keep already provisioned trust anchors and add the new trust anchor to be able to verify messages signed under the two different credentials' hierarchies. |

| Value | Name | Description |
|---|---|---|
| 0xFF | removeProvisioningTA | Client device 120 should remove a trust anchor used to validate the server messages for the provisioning protocol. Credentials bundle 420 does not include any credential bundle records 522, number of entries 506 is zero, and ecosystem identifier 520 is set to all 0xFF. |

Reserved field 414 is reserved for future use.

Nonce 416 is copied from nonce 230 of request template 126 when received from client device 120. Nonce 416 provides protection against reply attacks.

Credential Bundle

Figure 5:
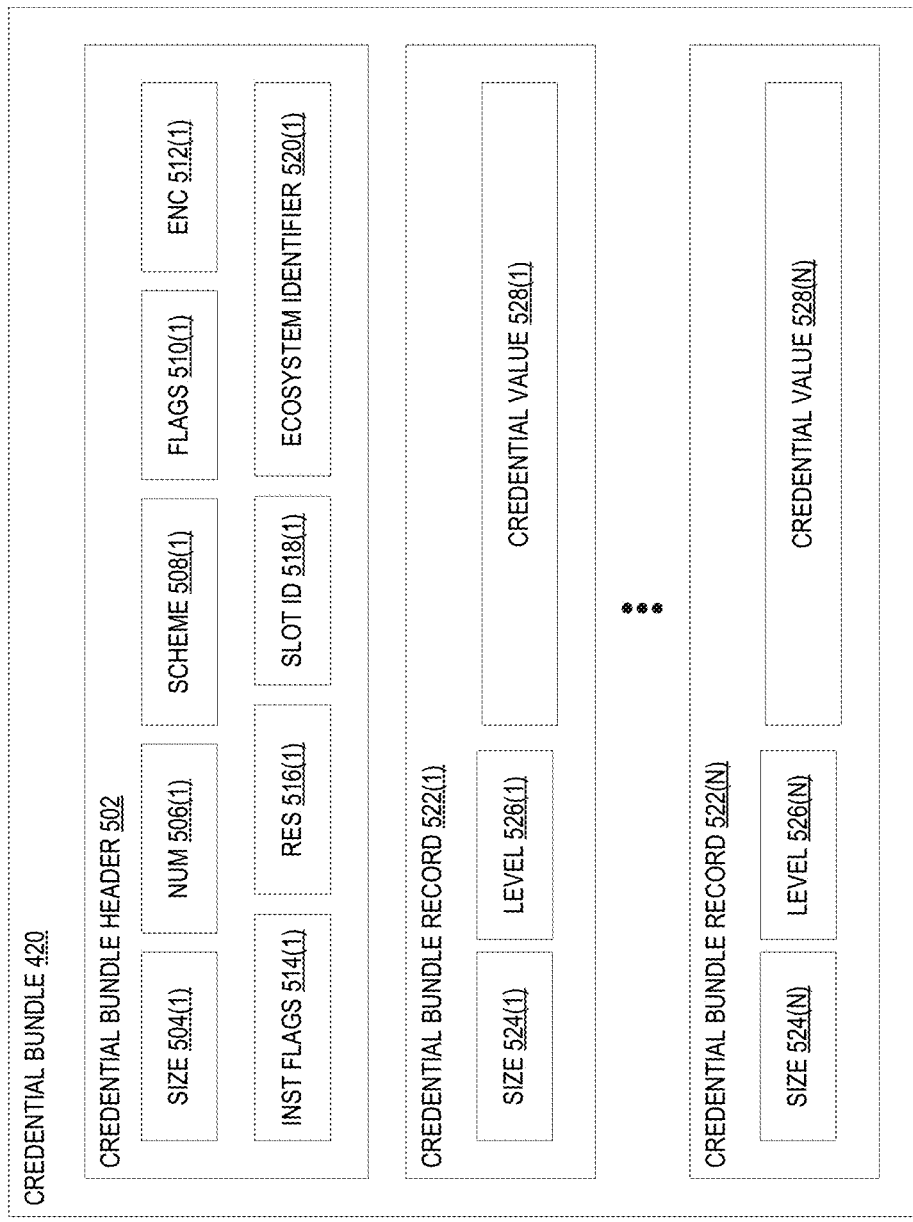
FIG. 5 is a block diagram illustrating the credential bundle of FIG. 4 in further example detail, in an embodiment.

FIG. 5 is a block diagram illustrating credential bundle 420 of FIG. 4 in further example detail. Credential bundle 420 includes information about issued credentials and/or associated trust anchors. When new credentials are to be installed on client device 120 and/or the set of trust anchors it to be updated, credential bundle 420 is included in response message 127. Credential bundle 420 includes a credential bundle header 502 and zero or more credential bundle records 522 that define a list of credentials that client device 120 should install.

Credential bundle header 502 includes the following fields: a credential bundle size 504 (e.g., 2 bytes in length), a number of entries 506 (e.g., 1 byte in length), a key scheme 508 (e.g., 1 byte in length), key flags 510 (e.g., 1 byte in length), key encoding 512 (e.g., 1 byte in length), installation flags 514 (e.g., 1 byte in length), reserved field 516 (e.g., 1 byte in length), slot identifier 518 (e.g., 24 bytes in length), and an ecosystem identifier 520 (e.g., 32 bytes in length). Each credential bundle record 522 includes the following information: a credential value size 524 (e.g., 2 bytes in length), a credential level 526 (e.g., 1 byte in length), and a credential value 528 (e.g., variable in length).

Credential Bundle Header

Credential bundle size 504 defines the size (in bytes) of credential bundle 420.

Number of entries 506 defines the number of credential bundle records 522 contained in credential bundle 420.

Key scheme 508 is used only when action code 412 is set to "generateKeyPair". The supported values are the same as defined for key scheme 324 of request template 126. When action code 412 is not set to "generateKeyPair", key scheme 508 should be zero (0x00).

Key flags 510 is used only when action code 412 is set to "generateKeyPair". The supported values are the same as defined for key flags 326 of request template 126.

Key encoding 512 defines the type of encoding used for the value of the credentials to be installed on client device 120. Example values include:

| Value | Name | Description |
|---|---|---|
| 0x00 | RAW_ENCODING | The value is to be used when credentials are provided in forms other than X.509 certificates. |
| 0xF0 | DER_ENCODING | The value is to be used when credentials are provided in the form of X.509 certificates. The values in each of the credentials record within the bundle MUST carry the DER representation of the certificates |

Installation flags 514 define the type of credential bundle 420 that is included in response message 127. Installation flags 514 may be one of the following values:

| Value | Name | Description |
|---|---|---|
| 0x00 | CREDS_CHAIN | Credential bundle 420 contains a full chain of credentials (e.g., a chain of certificates) that starts with the device's credential (e.g., an ecosystem certificate for client device 120) and ends with the ecosystem root credential (e.g., a Root certificate). This value MUST be set when action code 412 is set. |
| 0xFF | CREDS_ROOT | Credential bundle 420 contains a single credential bundle record 522 that includes a trust anchor for the ecosystem identified by ecosystem identifier 520. This value may be used for trust anchors that are not associated with any installed credentials and shall be used when action code 412 is set to installTrustAnchor or installProvisioningTA. |

Reserved field 516 is reserved for future use.

Slot identifier 518 identifies the slot in client device 120 that contains the credential's corresponding private key. This identifier may be the same as that used in the Credentials Registration Message, for example, as used in CREP protocol 106 and/or request template 126, to pre-register initial credentials and key pairs (e.g., the same identifier as the one provided in the device's Template message, such as request template message 126).

Ecosystem identifier 520 (truncated to the field size, e.g., 32 bytes in length) identifies the ecosystem associated with credentials of credential bundle 420 to be installed on client device 120. When the ecosystem identifier is shorter than the field length, the value is zero padded (0x00).

Credential Bundle Record

As noted above, credential bundle 420 may include one or more credential bundle records 522, and each credential bundle record 522 includes the following fields:

A credential value 528 (e.g., variable in length) contains the value of the credential to be installed on client device 120. For example, when the credential is an X.509 certificate, the value shall be the DER representation of the certificate. Credential value size 524 (e.g., 1 byte in length) defines the size (in bytes) of credential value 528. Credential level 526 (e.g., 1 byte in length) indicates a level, in the hierarchy of credentials included in the credential bundle, of credential bundle record 522. For example, where credential value 528 includes the public key present in the target slot, credential level 526 is zero (0x00), and when credential value 528 includes a credential of an intermediate CA that issued the device credential, credential level 526 is one (0x01). When installation flags 514 is set to CRED ROOT, credential level 526 should be set to 0xFF.

Response Message Authentication (RMA)

As shown in FIG. 4, response message authentication 422 has a fixed-sized response message authentication (RMA)

header 424 and a variable-sized RMA body 450. RMA header 424 (e.g., 40 bytes in length) includes the following fields: a key scheme 426 (e.g., 1 byte in length), a signing's public key flags 428 (e.g., 1 byte in length), a signing's public key encoding 430 (e.g., 1 byte in length), a reserved field 432 (e.g., 1 byte in length), a signature value size 434 (e.g., 2 bytes in length), a signing's public key Size 436 (e.g., 2 bytes in length), a KSK signature value size 438 (e.g., 2 bytes in length), and a KSK identifier 440 (e.g., 32 bytes in length).

RMA body 450 includes the following fields: a signature value 452 (e.g., variable in length), a signing's public key 454 (e.g., variable in length), and a KSK signature value 456 (e.g., variable in length) of the signing public key 454.

Response Message Authentication Header

Further detail of RMA header 424 fields are as follows:

Key scheme 426 defines the scheme used for KSK signature value 456 and uses values defined above for key scheme 324 of request template 126.

Signing key flags 428 define flags of KSK signature value 456 and uses values defined above for key flags 326 of request template 126.

Signing key encoding 430 defines the encoding of KSK signature value 456 and uses values defined above for key encoding 328 of request template 126.

Reserved field 432 is reserved for future use.

Signature value size 434 defines the size (in bytes) of KSK signature value 456. KSK signature value 456 is calculated on response header 402 and response body 404 of response message 127.

Signing key size 436 defines the size (in bytes) of signing public key 454. Signing public key 454 corresponds to a private key used by provisioning server 102 to sign the response message 127.

KSK signature value size 438 defines a size (in bytes) of KSK signature value 456. KSK signature value 456 is determined by provisioning manager 104 for signing public key 454.

KSK identifier 440 defines a hash calculated over signing public key 454.

Response Message Authentication Body

Further detail of RMA body 450 fields are as follows:

Signature value 452 is a signature calculated over response header 402 and response body 404 of response message 127 using a private key corresponding to signing public key 454.

Signing's public key 454 is a public key corresponding to a private key used by provisioning server 102 to generate response message authentication 422.

KSK signature value 456 is a value of a signature calculated over signing public key 454 and is in RAW format.

Provisioning Server Details

Figure 6:
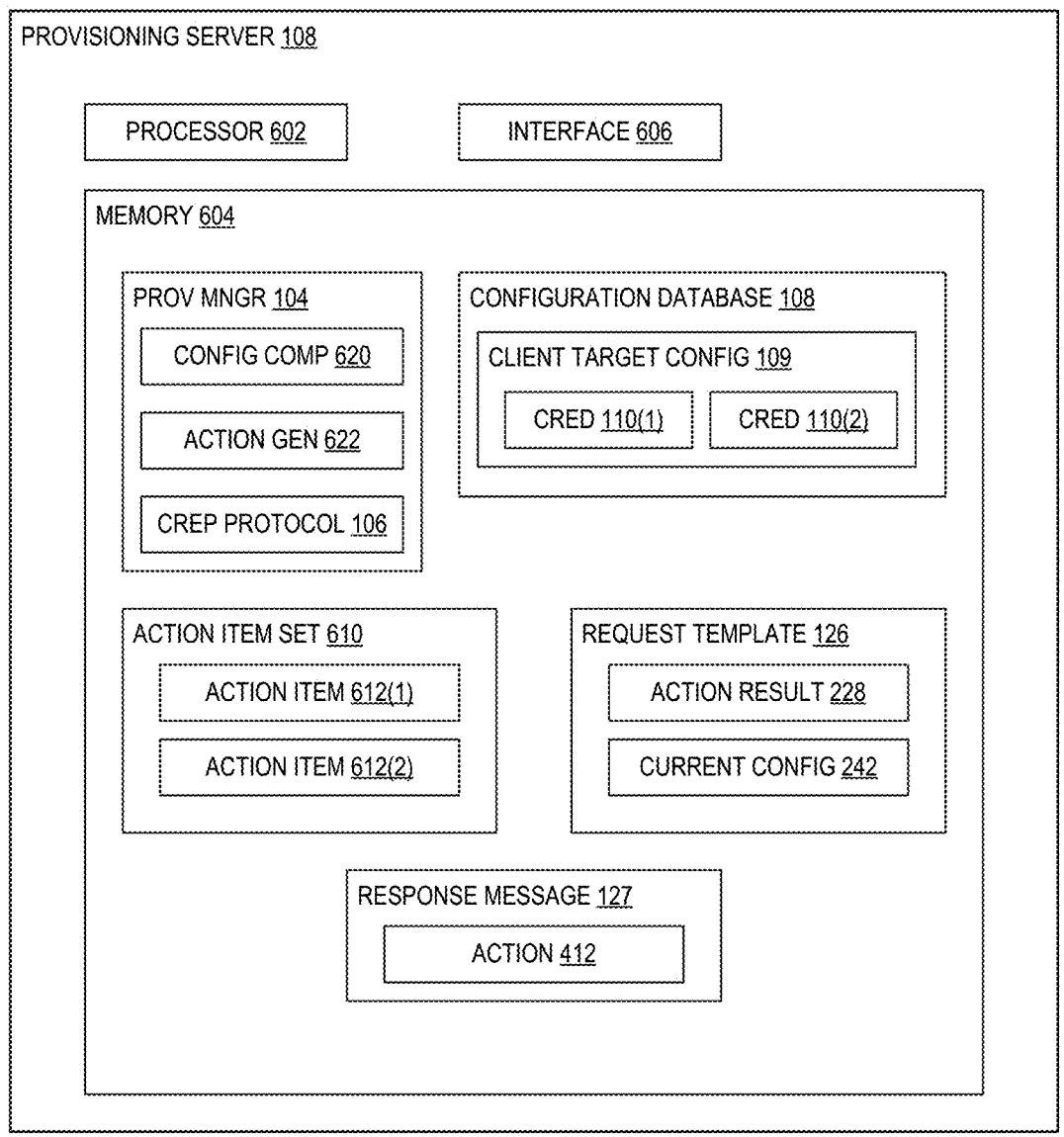
FIG. 6 is a functional block diagram illustrating the provisioning server of FIG. 1 in further example detail, in an embodiment.

FIG. 6 is a functional block diagram illustrating provisioning server 102 of FIG. 1 in further example detail. Provisioning server 102 is a computer server that includes at least one processor 602 and memory 604, communicatively coupled with the processor and storing machine readable instructions (e.g., software) executable by processor 602 to implement functionality of provisioning server 102 as described herein. Provisioning server 102 also includes an interface 606 that facilitates communication with client device 120, such as via one or more of the Internet, cellular networks, wired area networks, local area networks, wireless networks, wired networks, and so on. Interface 606 may use one or more communication protocols, including TPC, UDP, Wi-Fi (e.g., IEEE 802.11), Bluetooth, and so on. Particularly, the means of transferring messages between provisioning server 102 and client device 120 is not important, and may use more than one type of network and more than one protocol. In certain embodiments, provisioning server 102 is cloud based and may be accessible via the Internet. In other embodiments, provisioning server 102 may be in a protected environment and connect only to a protected network, provisioning only devices connect to the protected network.

Memory 604 may include one or more of RAM, ROM, FLASH, magnetic media, optical media, and so on. Although configuration database 108 is shown implemented within memory 604, configuration database 108 may be implemented external (e.g., as a network accessible storage device) to provisioning server 102 without departing from the scope hereof.

Provisioning manager 104 is software, including machine readable instructions stored in memory and executed by processor 602, that implement CREP protocol 106. Provisioning manager 104 may include a configuration comparator 620. When request template 126 is received from client device 120, configuration comparator 620 retrieves client target configuration 109 from configuration database 108 based upon client identifier 202 of request template 126. Configuration comparator 620 compares current configuration 242 of client device 120 against the client target configuration 109 to identify differences, and then, if needed, generates an action item set 610 defining one or more action items 612 to provision client device 120 as defined by client target configuration 109. In the example of FIG. 6, client target configuration 109 defines that credentials 110(1) and 110(2) should be present on client device 120, and since, in this example, client device 120 does not have either of credentials 110(1) or 110(2), configuration comparator 620 generates action item set 610 with two action items 612(1) and 612(2), where, for example, action item 612(1) installs credential 110(1) into client device 120, and action item 612(2) installs credential 110(2) into client device 120.

Provisioning manager 104 includes an action generator 622 that, based on CREP protocol 106, generates one or more response messages 127 to implement action items 612 of action item set 610. Where needed, action generator 622 may interact with one or both of first issuer 112(1) and second issuer 112(2) to obtain one or both of credentials 110(1) and 110(2), where they are not already stored within configuration database 108. In some cases, to obtain credentials 110 from issuers 112, provisioning server 102 needs a public key of client device 120. When the public key is not included within request template 126, action generator 622 generates one action item 612 that instructs client device 120 to generate a public/private key pair, and send the public key to provisioning server 102. In certain embodiments, provisioning manager 104 may store, in configuration database 108 and in association with client device 120, received public keys such that provisioning manager 104 may obtain credentials 110 before receiving the initial request template 126 from client device 120. Action generator 622 implements CREP protocol 106 to interactively provision client device 120 according to action item set 610, verifying correct provisioning by evaluating device status code 222 and current configuration 242 of request template 126 when received from client device 120.

When all action items 612 of action item set 610 have been completed, and current configuration 242 matches client target configuration 109, action generator 622 generates a final response message 127 to indicate to client device 120 that provisioning is complete.

Client Device Details

Figure 7:
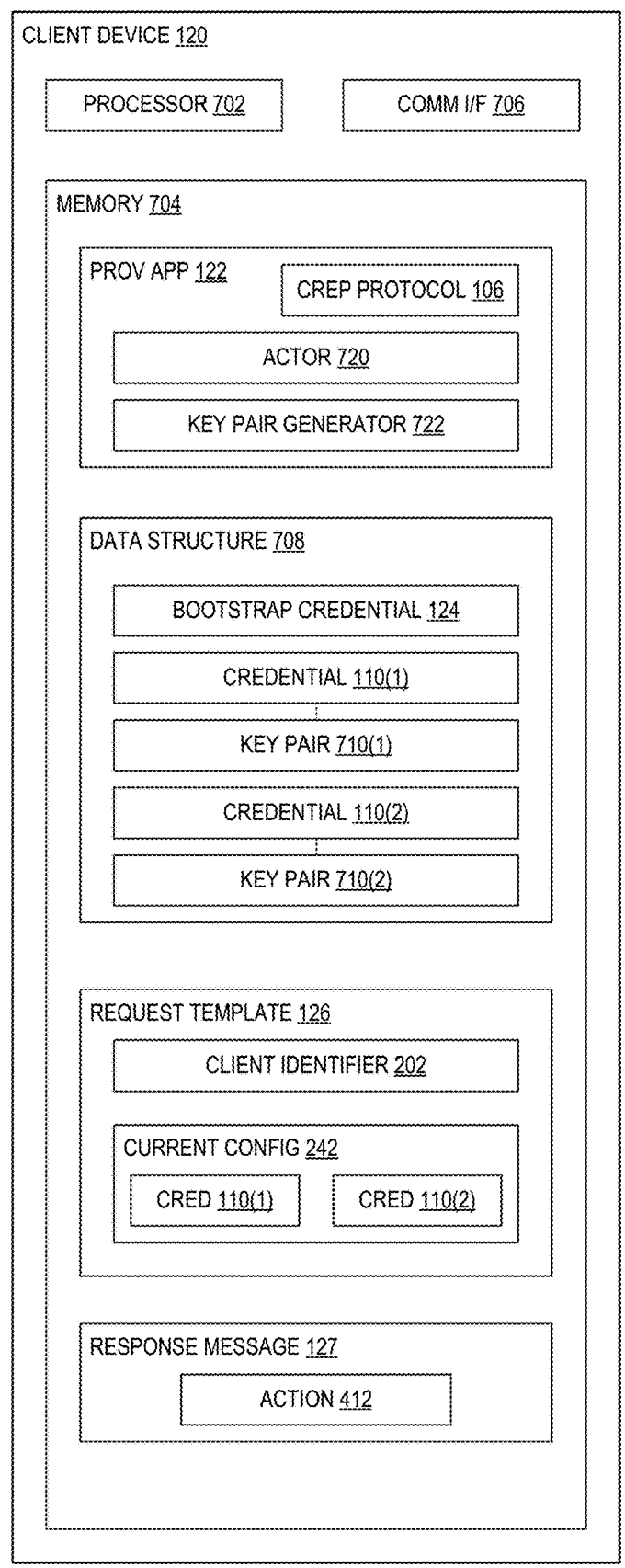
FIG. 7 is a functional block diagram illustrating the client device of FIG. 1 in further example detail, in an embodiment.

FIG. 7 is a functional block diagram illustrating client device 120 of FIG. 1 in further example detail. As noted above, client device 120 may represent any type of communicatively connected computing device that uses credentials when communicating with ecosystems 138, 148. Client device 120 may have a processor 702 communicatively coupled with a memory 704 storing machine-readable instructions (e.g., software) executable by processor 702 to implement functionality of client device 120 as described herein. Client device 120 may also include a communication interface 706 that facilitates communication with provisioning server 102 and/or first and second servers 132/142, via one or more of the Internet, cellular networks, wide area networks, local area networks, wireless networks, wired networks, and so on. Communication interface 706 may use one or more communication protocols, including TPC, UDP, Wi-Fi (e.g., IEEE 802.11), Bluetooth, and so on. In certain embodiments, client device 120 may connect to a proxy device or gateway (see FIG. 9 for further detail) to facilitate communications with provisioning server 102. Memory 704 may include one or more of RAM, ROM, FLASH, magnetic media, optical media, and so on. In certain embodiments, at least part of memory 704 may be implemented as a secure device (e.g., a special type of security memory chip such as STSAFE-A100 by STMicroelectronics®). In certain embodiments, processor 702 and memory 704 may be implemented as a microcontroller (e.g., AT32UC3B0128AU by Microchip®) or other similar single chip computers.

As noted above, client device 120 may be preconfigured with bootstrap credential 124, and may be auto-provisioned with additional credentials without any need to define which additional credentials are needed by client device 120. This greatly simplifies manufacture of client device 120, as the manufacturer need not obtain and install credentials of each client device 120. Rather, client device 120 may be automatically provisioned using CREP protocol 106 when initiated by a user of the client device.

Client device 120 may include a data structure 708 for storing bootstrap credentials 124 and credentials 110, such that credentials 110 are easily accessible when needed. In certain embodiments, data structure 708 may correspond to, and/or be implemented as current configuration 242 to reduce use of memory 704. In certain embodiments, data structure 708 may include at least one slot to store credential 110 and a corresponding key pair (private and public keys). that are updated based upon CREP protocol 106 as messages when credentials 110 are received from provisioning server 102, provisional application 122 may update data structure 708 to include credentials 110.

Provisioning application 122 may include an actor 720 and a key pair generator 722 that cooperate to implement action code 412 received in response message 127 from provisioning server 102. For example, when action code 412 is one of installTrustAnchor, installCredential, updateCredential, and installProvisioningTA, actor 720 updates data structure 708 with a credential 110 received in response message 127. In another example, where action is one of removeTrustAnchor, removeCredential, removeKeyPair, and removeProvisioningTA, actor 720 removes a corresponding credential 110 from data structure 708. In another example, when action code 412 is generateKeyPair, actor 720 invokes key pair generator 722 to generate a key pair 710. Accordingly, CREP protocol 106 controls provisioning application 122, actor 720 and key pair generator 722, to update data structure 708 with credentials 110 and/or corresponding key pairs 710 such that client device 120 is configured according to client target configuration 109.

CREP Protocol Message Exchange Example

Figure 8:
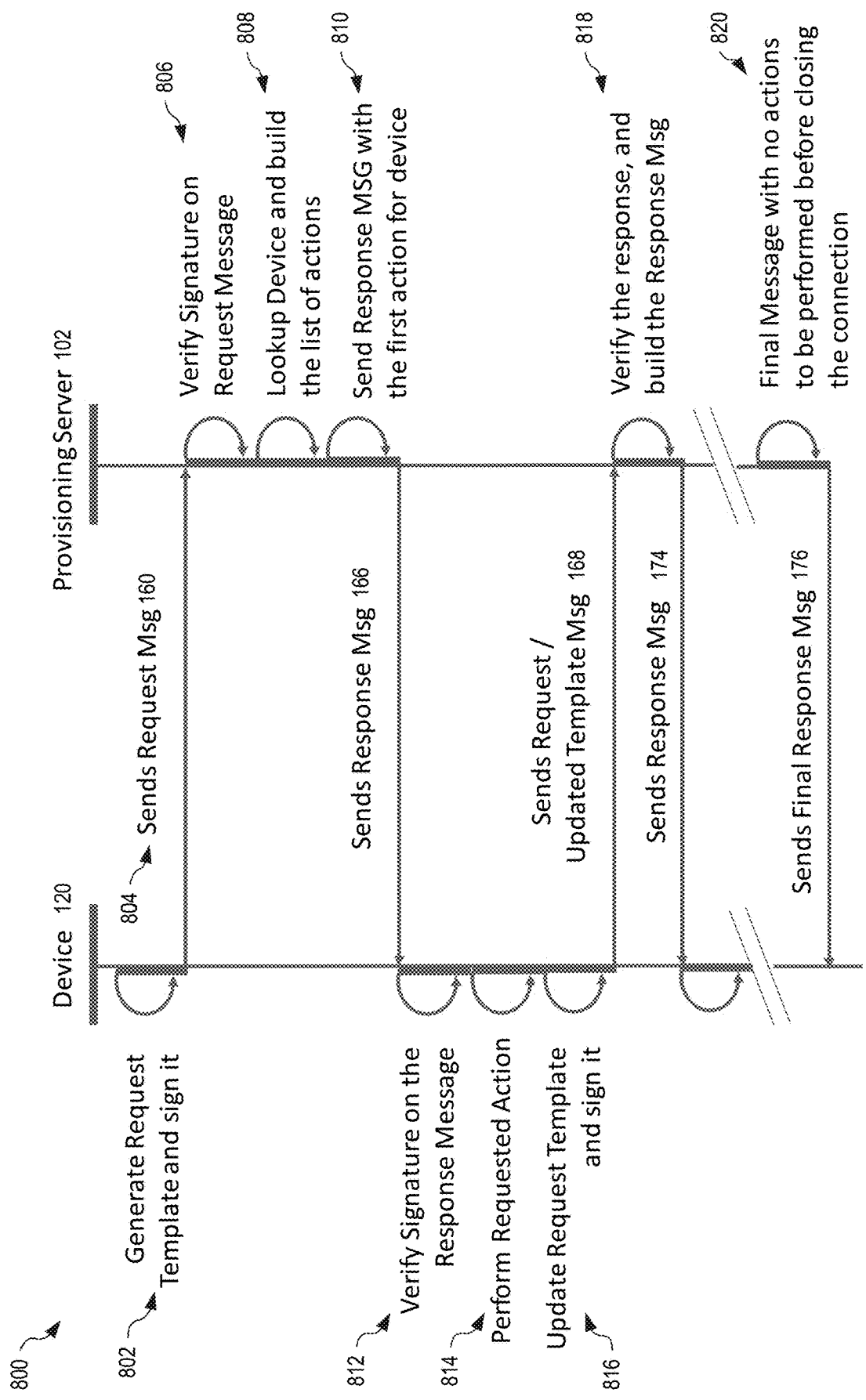
FIG. 8 is a data flow diagram illustrating example use of the CREP protocol between the client device and the provisioning server of FIG. 1, in an embodiment.

FIG. 8 is a data flow diagram illustrating example use of the CREP protocol 106 between the client device 120 and the provisioning server 102 of FIG. 1. FIGS. 1 through 8 are best viewed together with the following description.

In a first step 802, client device 120 generates request template 126 (FIGS. 2 and 3) according to CREP protocol 106. As described above, request template 126 includes client identifier 202 and current configuration 242 to indicate a current provisioning status of client device 120. For example, provisioning application 172 may generate current configuration 242 to indicate when certain credential slots of data structure 708 are empty (e.g., do not contain a credential), and to identify the credential 110 when the slot is not empty. Provisioning application 122 then signs request template 126 by generating message authentication 212 and sends request template 126 to provisioning server 102 as first message 160, as indicated in step 804.

In step 806, provisioning manager 104 of provisioning server 102 verifies/validates the signature (e.g., message authentication 212) of request template 126, received as first message 160. In step 808, the provisioning manager 104 retrieves, from configuration database 108, client target configuration 109 based upon client identifier 202 and builds action item set 610 based upon differences between slot configuration template 208, received in first message 160, and client target configuration 109. In a next step of CREP protocol 106, an action generator 622 of provisioning manager 104 generates response message 127 to implement action item 612(1) (e.g., a first action item of action item set 610), such as by including credential 110(1) within credential bundle 420, and setting action code 412 to installCredential. In step 810, provisioning manager 104 sends response message 127 to device 120 as second message 166.

Upon receiving second message 166, in step 812, provisioning application 122 of client device 120 verifies/validates the signature (e.g., response message authentication 422) of response message 127. In step 814, provisioning application 122 invokes actor 720 to implement action code 412 of response message 127. For example, actor 720 processes credential bundle header 502 and installs credential 110(1) from credential bundle record 522(1) into data structure 708. In step 816, provisioning application 122 updates request template 126 to reflect a current state of credentials stored on client device 120, sets status 222 to indicate whether the action was completed successfully, and then signs request template 126 by generating message authentication 212. Provisioning application 122 then sends the updates response message 127 to provisioning server 102 as third message 168.

In step 818, provisioning manager 104 verifies/validates the signature (e.g., message authentication 212) of request template 126, received in third message 168, and invokes action generator 622 to generate response message 127 based upon a next action item 612 of action item set 610. For example, Response message 127 is then sent to client device 120 as fourth message 174.o Provisioning application 122 of client device 120 repeats steps 812, 814, and 816, performing the action indicated in the received response message 127, updating the request template 126 accordingly, and sending updated request template 126 to provisioning server 102 as a next message.

Provisioning manager 104 repeats step 818 (e.g., generating a subsequent response message 127 and sending it to client device 120 as fourth message 174) until all action items 612 of action item set 610 have been successfully performed by client device 120.

When all action items 612 of action item set 610 are completed successfully by client device 120, in step 820, provisioning manager 104 generates a final response message 127 indicating no further actions are needed, sends final response message 127 (e.g., as final message 176) to client device 120, and closes the connection between provisioning server 102 and client device 120.

Where request template 126, received in response to response message 127 with an action, does not indicate success (e.g., device status code 222 indicates the client device was unable to successfully complete the requested action), provisioning manager 104 may retry the same action one or more times, may make an alternative action, and/or may abort the configuration of the client device (e.g., generating an alert or report indicating the failure).

Figure 9:
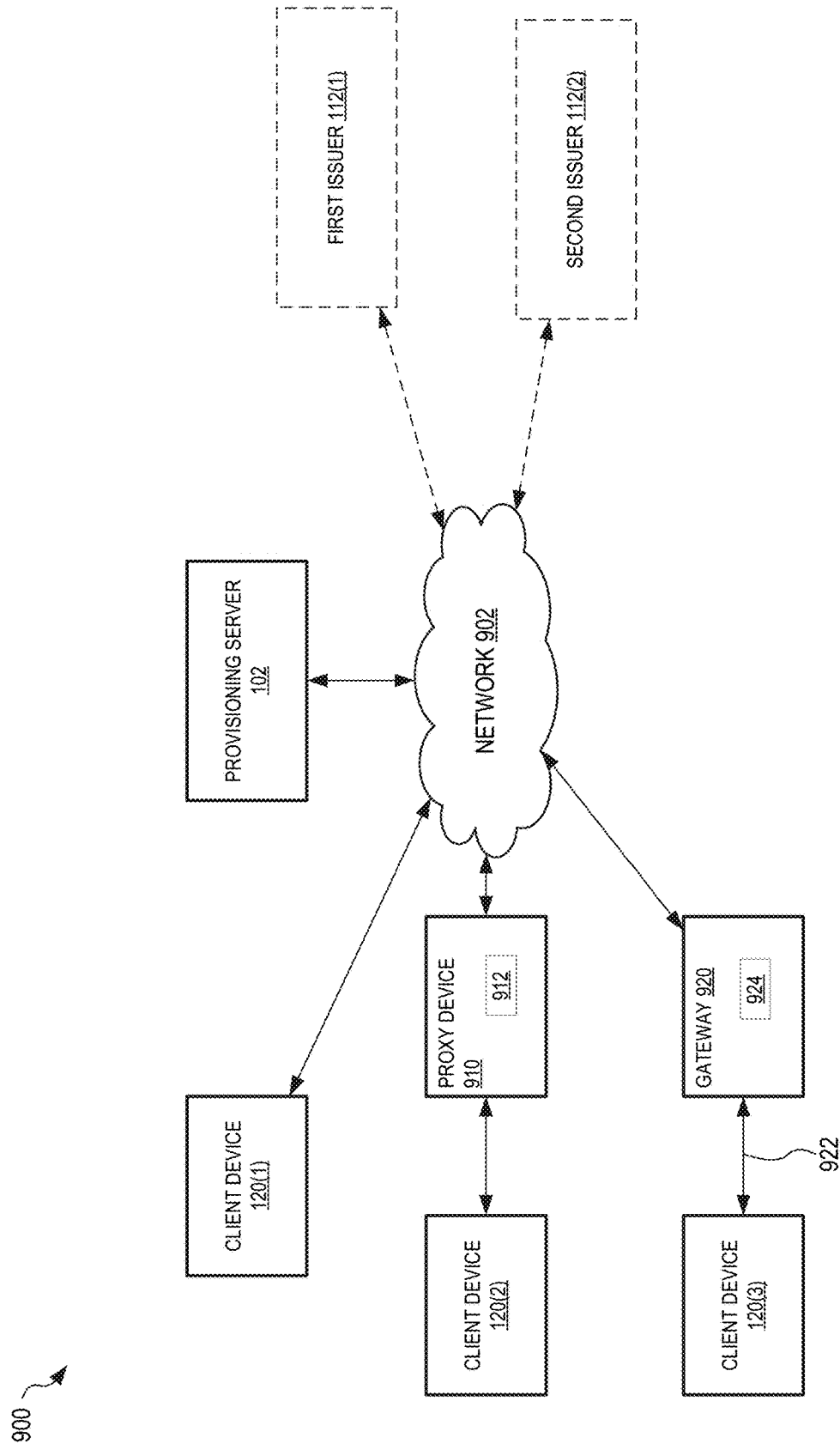
FIG. 9 is a block diagram illustrating example connectivity of client devices to the provisioning server of FIG. 1, in an embodiment.

FIG. 9 is a block diagram illustrating example connectivity of client devices 120 to provisioning server 102. Provisioning server 102 may connect to a network 902 (e.g., the Internet, wired and wireless networks) such that it is easily accessible to client devices 120. In a first connectivity example, client device 120(1) (e.g., a smartphone) may communicate directly with provisioning server 102 by connecting to network 902. For example, client device 120(1) may connect to network 902 using one or more of Wi-Fi, LAN, WAN, and/or cellular networks.

In a second connectivity example, a client device 120(2) (e.g., an IoT device) communicates with a proxy device 910 (e.g., a smartphone), which in turn communicates with network 902. In this example, client device 120(2) is unable to connect to network 902 until provisioned by provisioning server 102. Proxy device 910 includes a software module 912 (e.g., an app) that is configured to communicate (e.g., using Bluetooth, Wi-Fi, or other protocol) with client device 120(2) and with provisioning server 102 via network 902. Software module 912 may relay request template 126 from client device 120(2) to provisioning server 102, and relay response messages 127 from provisioning server 102 to client device 120(2). Accordingly, client device 120(2) and provisioning server 102 may utilize CREP protocol 106 to provision client device 120(2) via proxy device 910.

In a third connectivity example, a client device 120(3) (e.g., a remote sensor) communicates over a local network 922 (e.g., Z-Wave) with a gateway 920. Gateway 920 includes a software module 924 (e.g., a protocol converter) that is configured to communicate with client device 120(2) and with provisioning server 102 via network 902. For example, gateway 920 may be configured to send sensor data captured by client device 120(3) to a third-party device (not shown) via network 902. Software module 924 may relay request template 126 from client device 120(3) to provisioning server 102, and relay response message 127 from provisioning server 102 to client device 120(3). Accordingly, client device 120(3) and provisioning server 102 may utilize CREP protocol 106 to provision client device 120(3) via gateway 920. Advantageously, client devices 120 communicate only with provisioning server 102, and do not need to communicate with any of issuers 112(1) and 112(2). Provisioning server 102 may communicate with issuers 112 as needed during provisioning of client device 120.

Figure 10:
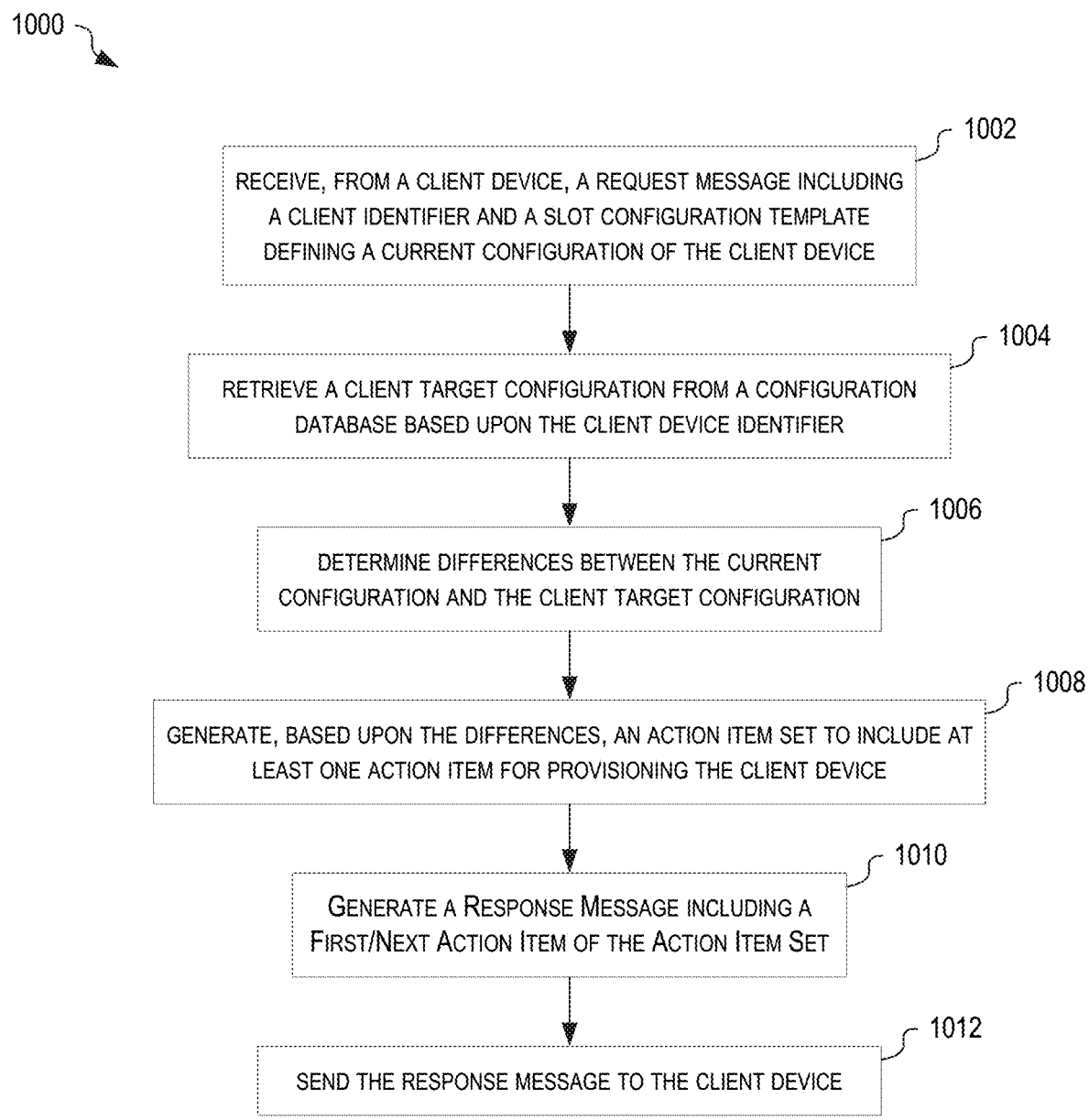
FIG. 10 is a flowchart illustrating one example method for template based credential provisioning, in an embodiment.

FIG. 10 is a flowchart illustrating one example method 1000 for template based credential provisioning. Method 1000 is for example implemented at least in part within provisioning manager 104 of provisioning server 102 of FIG. 1. In block 1002, method 1000 receives, from a client device, a request message including a client identifier and a slot configuration template defining a current configuration of the client device. In one example of block 1002, provisioning server 102 receives request template 126 in first message 160 from client device 120. In block 1004, method 1000 retrieves a client target configuration from a configuration database based upon the client device identifier. In one example of block 1004, provisioning manager 104 retrieves client target configuration 109 from configuration database 108 based upon client identifier 202 of request template 126. In block 1006, method 1000 determines differences between the current configuration and the client target configuration. In one example of block 1006, configuration comparator 620 compares current configuration 242 of request template 126 with client target configuration 109. In block 1008, method 1000 generates, based upon the differences, an action item set to include at least one action item for provisioning the client device. In one example of block 1008, action generator 622 generates action item set 610 to include action items 612(1) and 612(2) based upon differences between current configuration 242 of request template 126 with client target configuration 109. In block 1010, method 1000 generates a response message to include a first/next action item of the action item set. In one example of block 1010, provisioning manager 104 generates response message 127 to include action code 412 based upon action item 612(1). In block 1012, method 1000 sends the response message to the client device. In one example of block 1012, provisioning manager 104 sends response message 127 as second message 166 to client device 120.

Blocks 1010 and 1012 may repeat, for each subsequently received request template 126, until actions items 612 of action item set 610 have been completed. When action item set 610 is completed, block 1012 sends a final response message 127 with no action and the connection to the client device 120 is closed.

Figure 11:
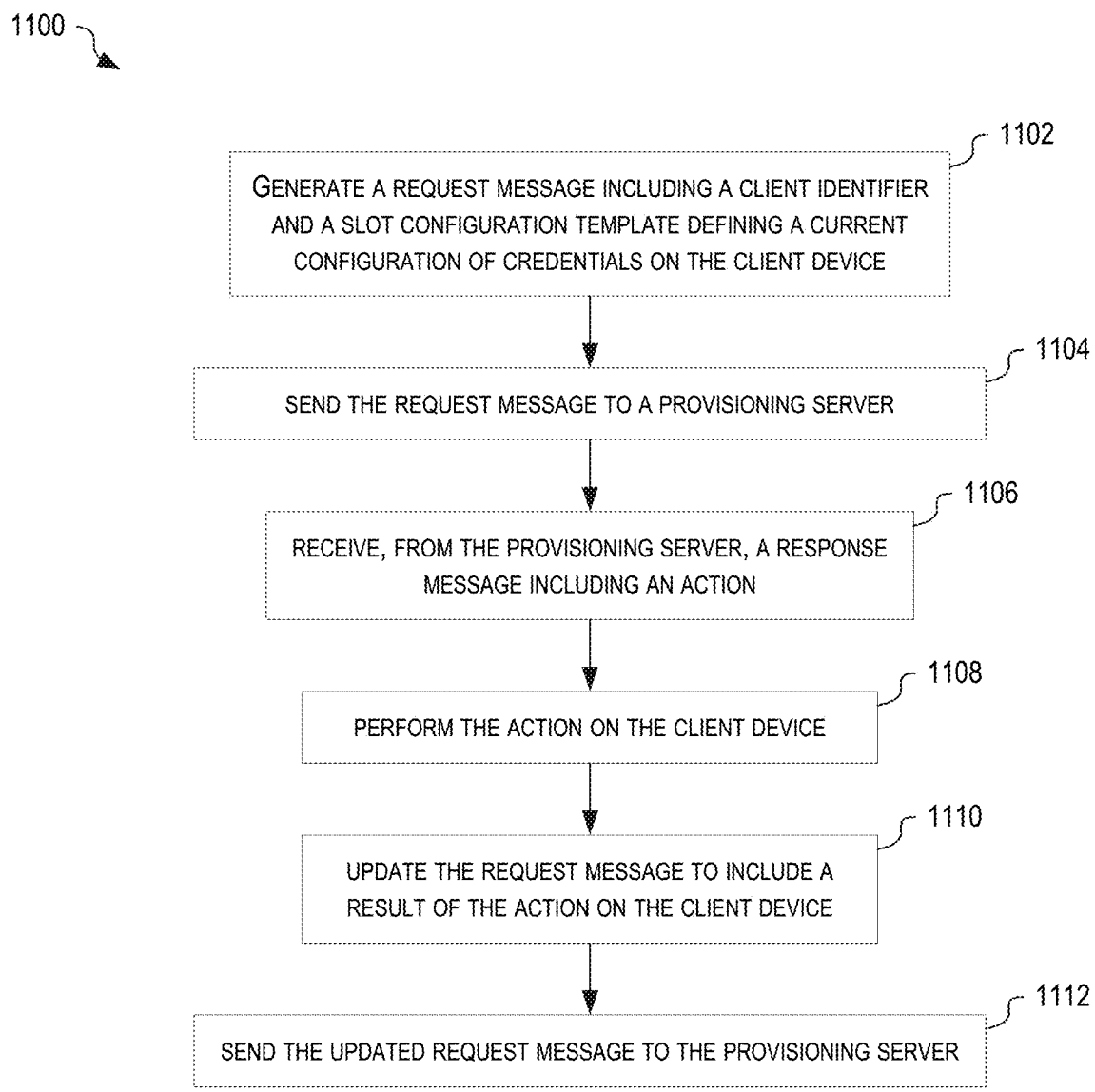
FIG. 11 is a flowchart illustrating one example method for template based credential provisioning, in an embodiment.

FIG. 11 is a flowchart illustrating one example method 1100 for template based credential provisioning. Method 1100 is for example implemented at least in part within provisioning application 122 of client device 120 of FIG. 1.

In block 1102, method 1100 generates a request message including a client identifier and a slot configuration template defining a current configuration of credentials on the client device. In one example of block 1102, provisioning application 122 generates request template 126 to include client identifier 202 and current configuration 242 based upon credentials 110 within data structure 708. In block 1104, method 1100 sends the request message to a provisioning server. In one example of block 1104, provisioning application 122 sends request template 126 to provisioning server 102 as first message 160. In block 1106, method 1100 receives, from the provisioning server, a response message including an action. In one example of block 1106, provisioning application 122 receives, from provisioning server 102, second message 166 including response message 127 with action code 412.

In block 1108, method 1100 performs the action on the client device. In one example of block 1108, provisioning application 122 invokes actor 720 to install credential 110(1) in data structure 708. In block 1110, method 1100 updates the request message to include a result of the action on the client device. In one example of block 1110, provisioning application 122 updates current configuration 242 of request template 126 to include changes to data structure 708 and sets device status code 222 to indicate success (or not) of actor 720 completing actions indicated by action code 412. In block 1112, method 1100 sends the updated request message to the provisioning server. In one example of block 1112, provisioning application 122 sends updates request template 126 to provisioning server 102 as third message 168.

Blocks 1106 through 1112 repeat until the received response message 127 includes no action, which indicates that provisioning of client device 120 is complete.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A certificate provisioning method, comprising:
receiving, within a provisioning server and from a client device, a request message including a client identifier and a slot configuration template defining a current configuration of credentials on the client device;
retrieving a client target configuration from a configuration database based upon the client identifier;
comparing each installed credential identifier of the slot configuration template with credentials defined within the client target configuration;
generating, based upon the differences comparison, an action item set to include at least one action item for provisioning the client device, wherein the generated action item removes ones of the installed credential identifiers not matching the credentials defined within the client target configuration and install ones of the credentials defined within the client target configuration not matching any installed credential identifier;
generating a response message including a first action item of the action item set; and
sending the response message to the client device.

2. The certificate provisioning method of claim 1, further comprising validating a trust anchor list and of the request message.

3. The certificate provisioning method of claim 1, further comprising validating a bootstrap credential identifier of the request message.

4. The certificate provisioning method of claim 1, further comprising:
determining that a bootstrap credential of the request message is based upon public key cryptography; and
generating a response message authentication for the response message as a signature of a response header and a response body of the response message using a private key of a provisioning server key pair.

5. The certificate provisioning method of claim 1, further comprising:
receiving, from the client device, an updated request message including a first action result indicating whether the first action item was performed successfully by the client device and including an updated slot configuration template defining the current configuration of the client device;
determining a next action of the action item set;
updating the response message to include the next action; and
sending the updated response message to the client device.

6. The certificate provisioning method of claim 1, further comprising:

receiving, from the client device, an updated request message including a first action result indicating whether the first action item was performed by the client device and including an updated current configuration of the client device;
determining that the first action result indicates success;
determining there are no further actions in the action item set;
updating the response message to indicate no action; and
sending the updated response message to the client device.

7. A certificate provisioning method, comprising:
generating, within a client device, a request message including a client identifier and a slot configuration template defining a current configuration of credentials on the client device;
sending the request message to a provisioning server;
receiving, from the provisioning server, a response message including an action, wherein the action includes at least one credential identifier corresponding to certificates to be installed on the client device from a device manufacturer;
performing the action on the client device that includes generating a client target configuration to include the at least one credential identifier;
updating the request message to include a result of the action on the client device; and
sending the updated request message to the provisioning server.

8. The certificate provisioning method of claim 7, further comprising generating a new key pair for one slot of the slot configuration template in response to the action.

9. The certificate provisioning method of claim 7, further comprising deleting a key pair from one slot of the slot configuration template in response to the action.

10. The certificate provisioning method of claim 7, further comprising installing a trust credential from the response message in response to the action.

11. The certificate provisioning method of claim 7, further comprising retrieving a credential corresponding to the at least one credential identifier from a credential issuer.

12. A certificate provisioning system, comprising:
at least one processor:
a memory communicatively coupled with the at least one processor and storing machine readable instructions that, when executed by the processor, cause the processor to:
receive, within a provisioning server and from a client device, a request message including a client identifier and a slot configuration template defining a current configuration of credentials on the client device;
retrieve a client target configuration from a configuration database based upon the client identifier;
compare each installed credential identifier of the slot configuration template with credentials defined within the client target configuration;
generate, based upon the comparison, an action item set to include at least one action item for provisioning the client device, wherein the generated action item removes ones of the installed credential identifiers not matching the credentials defined within the client target configuration and install ones of the credentials defined within the client target configuration not matching any installed credential identifier;
generate a response message including a first action item of the action item set; and send the response message to the client device.

13. The certificate provisioning system of claim 12, comprising further machine-readable instructions that, when executed by the processor, cause the processor to validate a trust anchor list and of the request message.

14. The certificate provisioning system of claim 12, comprising further machine-readable instructions that, when executed by the processor, cause the processor to validate a bootstrap credential identifier of the request message.

15. The certificate provisioning system of claim 12, comprising further machine- readable instructions that, when executed by the processor, cause the processor to:
    determine that a bootstrap credential of the request message is based upon public key cryptography; and
    generate a response message authentication for the response message as a signature of a response header and a response body of the response message using a private key of a provisioning server key pair.

16. The certificate provisioning system of claim 12, comprising further machine-readable instructions that, when executed by the processor, cause the processor to:
    receive, from the client device, an updated request message including a first action result indicating whether the first action item was performed successfully by the client device and including an updated slot configuration template defining the current configuration of the client device;
    determine a next action of the action item set;
    update the response message to include the next action; and
    send the updated response message to the client device.

17. The certificate provisioning system of claim 12, comprising further machine-readable instructions that, when executed by the processor, cause the processor to:
    receive, from the client device, an updated request message including a first action result indicating whether the first action item was performed by the client device and including an updated current configuration of the client device;
    determine that the first action result indicates success;
    determine there are no further actions in the action item set;
    update the response message to indicate no action; and
    send the updated response message to the client device.

18. A non-transitory computer readable storage medium, storing a computer instruction, wherein the computer instruction, when executed by a computer, causes the computer to perform operations, comprising:
    receiving, within a provisioning server and from a client device, a request message including a client identifier and a slot configuration template defining a current configuration of credentials on the client device;
    retrieving a client target configuration from a configuration database based upon the client identifier;
    comparing each installed credential identifier of the slot configuration template with credentials defined within the client target configuration;
    generating, based upon the comparison, an action item set to include at least one action item for provisioning the client device, wherein the generated action item removes ones of the installed credential identifiers not matching the credentials defined within the client target configuration and install ones of the credentials defined within the client target configuration not matching any installed credential identifier;
    generating a response message including a first action item of the action item set; and sending the response message to the client device.

19. The non-transitory computer readable storage medium of claim 18, further comprising computer instruction that, when executed by the computer, causes the computer to perform operations including validating a trust anchor list and of the request message.

20. The non-transitory computer readable storage medium of claim 18, further comprising computer instruction that, when executed by the computer, causes the computer to perform operations including validating a bootstrap credential identifier of the request message.

21. The non-transitory computer readable storage medium of claim 18, further comprising computer instruction that, when executed by the computer, causes the computer to perform operations including:
    determining that a bootstrap credential of the request message is based upon public key cryptography; and
    generating a response message authentication for the response message as a signature of a response header and a response body of the response message using a private key of a provisioning server key pair.

22. The non-transitory computer readable storage medium of claim 18, further comprising computer instruction that, when executed by the computer, causes the computer to perform operations including:
    receiving, from the client device, an updated request message including a first action result indicating whether the first action item was performed successfully by the client device and including an updated slot configuration template defining the current configuration of the client device;
    determining a next action of the action item set;
    updating the response message to include the next action; and
    sending the updated response message to the client device.

23. The non-transitory computer readable storage medium of claim 18, further comprising computer instruction that, when executed by the computer, causes the computer to perform operations including:
    receiving, from the client device, an updated request message including a first action result indicating whether the first action item was performed by the client device and including an updated current configuration of the client device;
    determining that the first action result indicates success;
    determining there are no further actions in the action item set;
    updating the response message to indicate no action; and
    sending the updated response message to the client device.

24. A certificate provisioning system, comprising:
    at least one processor:
    a memory communicatively coupled with the at least one processor and storing machine readable instructions that, when executed by the processor, cause the processor to:
    generate, within a client device, a request message including a client identifier and a slot configuration template defining a current configuration of credentials on the client device;
    send the request message to a provisioning server;
    receive, from the provisioning server, a response message including an action, wherein the action includes at least one credential identifier corresponding to certificates to be installed on the client device from a device manufacturer;

perform the action on the client device that includes generating a client target configuration to include the at least one credential identifier;
update the request message to include a result of the action on the client device; and send the updated request message to the provisioning server.

25. The certificate provisioning system of claim 24, comprising further machine-readable instructions that, when executed by the processor, cause the processor to generate a new key pair for one slot of the slot configuration template in response to the action.

26. The certificate provisioning system of claim 24, comprising further machine-readable instructions that, when executed by the processor, cause the processor to delete a key pair from one slot of the slot configuration template in response to the action.

27. The certificate provisioning system of claim 24, comprising further machine-readable instructions that, when executed by the processor, cause the processor to install a trust credential from the response message in response to the action.

28. The certificate provisioning system of claim 24, comprising further machine-readable instructions that, when executed by the processor, cause the processor to retrieve a credential corresponding to the at least one credential identifier from a credential issuer.

29. A non-transitory computer readable storage medium, storing a computer instruction, wherein the computer instruction, when executed by a computer, causes the computer to perform operations, comprising:
generating, within a client device, a request message including a client identifier and a slot configuration template defining a current configuration of credentials on the client device;
sending the request message to a provisioning server;
receiving, from the provisioning server, a response message including an action, wherein the action includes at least one credential identifier corresponding to certificates to be installed on the client device from a device manufacturer;
performing the action on the client device that includes generating a client target configuration to include the at least one credential identifier;
updating the request message to include a result of the action on the client device; and sending the updated request message to the provisioning server.

30. The non-transitory computer readable storage medium of claim 29, further comprising computer instruction that, when executed by the computer, causes the computer to perform operations including generating a new key pair for one slot of the slot configuration template in response to the action.

31. The non-transitory computer readable storage medium of claim 29, further comprising computer instruction that, when executed by the computer, causes the computer to perform operations including deleting a key pair from one slot of the slot configuration template in response to the action.

32. The non-transitory computer readable storage medium of claim 29, further comprising computer instruction that, when executed by the computer, causes the computer to perform operations including installing a trust credential from the response message in response to the action.

33. The non-transitory computer readable storage medium of claim 29, further comprising computer instruction that, when executed by the computer, causes the computer to perform operations including retrieving a credential corresponding to the at least one credential identifier from a credential issuer.

* * * * *